(12) United States Patent
Kanbe

(10) Patent No.: US 7,292,386 B2
(45) Date of Patent: Nov. 6, 2007

(54) ELECTROPHORETIC APPARATUS AND ELECTRONIC EQUIPMENT

(75) Inventor: Sadao Kanbe, Suwa (JP)

(73) Assignee: Seiko Epson Corporation, JPX ( * ) Notice: Subject to any disclaimer, the term of this patent is extended or adjusted under 35 U.S.C. 154(b) by 498 days.

(21) Appl. No.: 10/644,892

(22) Filed: Aug. 20, 2003

(65) Prior Publication Data

US 2005/0094247 A1    May 5, 2005

(30) Foreign Application Priority Data

| Aug. 22, 2002 | (JP) | ............................. 2002-242093 |
| Aug. 22, 2002 | (JP) | ............................. 2002-242094 |
| Jul. 18, 2003 | (JP) | ............................. 2003-198959 |

(51) Int. Cl.
   *G02B 26/00*    (2006.01)

(52) U.S. Cl. ...................................... 359/296; 345/107

(58) Field of Classification Search ................ 359/290, 359/295, 296, 245; 345/107
See application file for complete search history.

(56) References Cited

U.S. PATENT DOCUMENTS

| 5,930,026 | A | 7/1999 | Jacobsen et al. |
| 6,025,896 | A | 2/2000 | Hattori et al. |
| 6,130,774 | A | 10/2000 | Albert et al. |
| 2003/0030884 | A1* | 2/2003 | Minami ...................... 359/296 |

FOREIGN PATENT DOCUMENTS

| JP | 64-086116 | 3/1989 |
| JP | 2001-235771 | 8/2001 |
| JP | 2002-202534 | 7/2002 |
| JP | 2002-202593 | 7/2002 |
| JP | 2003-140198 | 5/2003 |
| TW | 371328 | 1/1987 |

OTHER PUBLICATIONS

Examination result issued in corresponding Taiwan application.

* cited by examiner

*Primary Examiner*—Evelyn A. Lester
(74) *Attorney, Agent, or Firm*—Harness, Dickey & Pierce, P.L.C.

(57) ABSTRACT

A mixture of a first material having high chemical affinity for the electrophoretic particles 6*a* and a second material having low chemical affinity therefor is used as a binder for fixing microcapsules 5 between a first electrode 3 and a second electrode 4.

6 Claims, 16 Drawing Sheets

ELECTROPHORETIC APPARATUS AND ELECTRONIC EQUIPMENT

FIELD OF THE INVENTION

The present invention relates to an electrophoretic apparatus and electronic equipment provided with the same.

BACKGROUND OF THE INVENTION

Electrophoretic display devices that take advantage of the electrophoretic phenomenon are known as non-emissive display devices. The electrophoretic phenomenon refers to the phenomenon in which when an electric field is applied to a suspension composed of a liquid phase dispersion medium with fine particles dispersed therein, the particles, which are naturally charged through dispersion (electrophoretic particles), migrate due to a Coulomb force.

In a basic structure of the electrophoretic display device, one electrode and another electrode are facing each other with a predetermined spacing, and the above-described suspension (electrophoretic suspension) is enclosed therebetween. Furthermore, at least one electrode is transparent, and this transparent electrode side serves as an observation surface. When a potential difference is applied between these two electrodes, electrophoretic particles are attracted to either of the electrodes, depending on the direction of the electric field.

Consequently, in this structure, when the dispersion medium is dyed with a dye and the electrophoretic particles are composed of pigment particles, either the color of the electrophoretic particles or the color of the dye can be observed, depending on the direction of the electric field through the transparent observation surface. Therefore, an image can be displayed by forming the electrode with a pattern in accordance with each pixel, and controlling a voltage applied to each pixel electrode.

Such an electrophoretic display device is noted as an electro-optical apparatus suitable for a new display because of the advantages of a simple configuration, a wide viewing angle range, a low power consumption, a display image holding performance (hereafter referred to as "memorization property"), and the like.

A microcapsule type electrophoretic display device is an example of an electrophoretic display device (for example, refer to the following Patent literature 1). In this device, a plurality of microcapsules containing an electrophoretic suspension are disposed between a pair of electrodes. In this device, a capsule film of each microcapsule is composed of, for example, a mixture of gelatin and gum Arabic. This microcapsule is fixed between the electrodes with a binder made of a silicone resin, an acrylic resin, an urethane resin or the like. See, for example, Japanese Unexamined Patent Application Publication No. 1-86116.

However, conventional electrophoretic display devices are susceptible to improvement in the compatibility between the memorization property and the erasability. That is, when the application of a voltage is stopped after an image is displayed by application of the voltage, the displayed image disappears in a short time. On the other hand, when the memorization property is improved, erasure is not easily performed due to phenomena such as image persistence, and rewrite of the display becomes difficult.

SUMMARY OF THE INVENTION

The present invention was made to overcome the above-described problems in the conventional technology. Accordingly, it is an object of the present invention to provide a electrophoretic display device having an excellent memorization property and excellent □ras ability.

In order to overcome the above-described problems, the present invention provides an electrophoretic apparatus (a first electrophoretic apparatus) including a first electrode, a second electrode and a plurality of closed spaces divided by partitions, wherein the above-described closed space contains an electrophoretic suspension in which electrophoretic particles are dispersed in a dispersion medium, the above-described electrophoretic particles migrate by application of a voltage via the above-described first electrode and the above-described second electrode, a component is disposed between the above-described closed space and at least one of the above-described first electrode and the above-described second electrode, and the above-described component is composed of a mixture including at least two different materials of a first material and a second material.

The present invention also provides an electrophoretic apparatus corresponding to the above-described first electrophoretic apparatus, wherein the affinity of the above-described first material for the above-described electrophoretic particles is higher than the affinity of the above-described second material for the above-described electrophoretic particles.

The present invention also provides an electrophoretic apparatus corresponding to the above-described first electrophoretic apparatus, wherein the above-described first material and the above-described second material have different holding powers for holding the uneven distribution state of the above-described electrophoretic particles without applying any voltage, the uneven distribution state being caused by the application of a voltage, and the above-described holding power of the above-described first material being higher than that of the above-described second material.

The present invention also provides an electrophoretic apparatus corresponding to the above-described first electrophoretic apparatus, wherein the polarity of the above-described first material is higher than the polarity of the above-described second material.

The present invention also provides an electrophoretic apparatus corresponding to the above-described first electrophoretic apparatus, wherein the above-described electrophoretic particles are titanium dioxide ($TiO_2$) particles, the above-described first material is an acrylic resin, and the above-described second material is a silicone resin.

The present invention also provides an electrophoretic apparatus corresponding to the above-described first electrophoretic apparatus, wherein the above-described electrophoretic particles are composed of positively charged particles and negatively charged particles which have colors different from each other.

The present invention also provides an electrophoretic apparatus corresponding to the above-described first electrophoretic apparatus, wherein the above-described electrophoretic particles are composed of titanium dioxide ($TiO_2$) particles and colored particles made of an acrylic resin, the above-described first material is an acrylic resin, and the above-described second material is a silicone resin.

The present invention also provides an electrophoretic apparatus (a second electrophoretic apparatus) including a first electrode, a second electrode and a plurality of microcapsules, wherein the above-described microcapsule contains an electrophoretic suspension in which electrophoretic particles are dispersed in a dispersion medium, the above-described electrophoretic particles migrate by application of a voltage via the above-described first electrode and the above-described second electrode, a component is disposed between the above-described microcapsules and at least one of the above-described first electrode and the above-described second electrode, and the above-described component is composed of a mixture including at least two different materials of a first material and a second material.

The present invention also provides an electrophoretic apparatus corresponding to the above-described second electrophoretic apparatus, wherein the affinity of the above-described first material for the above-described electrophoretic particles is higher than the affinity of the above-described second material for the above-described electrophoretic particles.

The present invention also provides an electrophoretic apparatus corresponding to the above-described second electrophoretic apparatus, wherein the first material and the second material have different holding powers for holding the uneven distribution state of the above-described electrophoretic particles without applying any voltage, the uneven distribution state being caused by the application of a voltage, and the above-described holding power of the above-described first material is higher than that of the above-described second material.

The present invention also provides an electrophoretic apparatus corresponding to the above-described second electrophoretic apparatus, wherein the polarity of the above-described first material is higher than the polarity of the above-described second material.

The present invention also provides an electrophoretic apparatus corresponding to the above-described second electrophoretic apparatus, wherein the above-described electrophoretic particles are titanium dioxide ($TiO_2$) particles, the above-described first material is an acrylic resin, and the above-described second material is a silicone resin.

The present invention also provides an electrophoretic apparatus corresponding to the above-described second electrophoretic apparatus, wherein the above-described electrophoretic particles are composed of positively charged particles and negatively charged particles which have colors different from each other.

The present invention also provides an electrophoretic apparatus corresponding to the above-described second electrophoretic apparatus, wherein the above-described electrophoretic particles are composed of titanium dioxide ($TiO_2$) particles and colored particles made of acrylic resin, the above-described first material is an acrylic resin, and the above-described second material is a silicone resin.

The present invention also provides an electrophoretic apparatus (a third electrophoretic apparatus) including a first electrode, a second electrode and a plurality of closed spaces divided by partitions, wherein the above-described closed space contains an electrophoretic suspension in which electrophoretic particles are dispersed in a dispersion medium, the above-described electrophoretic particles migrate by application of a voltage via the above-described first electrode and the above-described second electrode, a component is disposed between the above-described closed space and at least one of the above-described first electrode and the above-described second electrode, and the above-described component is composed of at least a first component made of a first material and a second component made of a second material different from the above-described first material.

The present invention also provides an electrophoretic apparatus corresponding to the above-described third electrophoretic apparatus, wherein the affinity of the above-described first material for the above-described electrophoretic particles is higher than the affinity of the above-described second material for the above-described electrophoretic particles.

The present invention also provides an electrophoretic apparatus corresponding to the above-described third electrophoretic apparatus, wherein the above-described first material and the above-described second material have different holding powers for holding the uneven distribution state of the above-described electrophoretic particles without applying any voltage, the uneven distribution state being caused by the application of a voltage, and the holding power of the above-described first material is higher than that of the above-described second material.

The present invention also provides an electrophoretic apparatus corresponding to the above-described third electrophoretic apparatus, wherein the polarity of the above-described first material is higher than the polarity of the above-described second material.

The present invention also provides an electrophoretic apparatus corresponding to the above-described third electrophoretic apparatus, wherein the above-described first component is disposed closer to at least one of the above-described first electrode and the above-described second electrode than is the above-described second component.

The present invention also provides an electrophoretic apparatus corresponding to the above-described third electrophoretic apparatus, wherein the above-described first component is disposed in contact with at least one of the above-described first electrode and the above-described second electrode.

The present invention also provides an electrophoretic apparatus corresponding to the above-described third electrophoretic apparatus, wherein the above-described electrophoretic particles are titanium dioxide ($TiO_2$) particles, the above-described first material is an acrylic resin, and the above-described second material is a silicone resin.

The present invention also provides an electrophoretic apparatus corresponding to the above-described third electrophoretic apparatus, wherein the above-described electrophoretic particles are composed of positively charged particles and negatively charged particles which have colors different from each other.

The present invention also provides an electrophoretic apparatus corresponding to the above-described third electrophoretic apparatus, wherein the above-described electrophoretic particles are composed of titanium dioxide ($TiO_2$) particles and colored particles made of an acrylic resin, the above-described first material is an acrylic resin, and the above-described second material is a silicone resin.

The present invention also provides an electrophoretic apparatus (a fourth electrophoretic apparatus) including a first electrode, a second electrode and a plurality of microcapsules, wherein the above-described microcapsule contains an electrophoretic suspension in which electrophoretic particles are dispersed in a dispersion medium, the above-described electrophoretic particles migrate by application of a voltage via the above-described first electrode and the above-described second electrode, a component is disposed between the above-described microcapsules and at least one of the above-described first electrode and the above-described second electrode, and the above-described component is composed of at least a first component made of a first material and a second component made of a second material different from the above-described first material.

The present invention also provides an electrophoretic apparatus corresponding to the above-described fourth electrophoretic apparatus, wherein the affinity of the above-described first material for the above-described electrophoretic particles is higher than the affinity of the above-described second material for the above-described electrophoretic particles.

The present invention also provides an electrophoretic apparatus corresponding to the above-described fourth electrophoretic apparatus, wherein the above-described first material and the above-described second material have different holding powers for holding the uneven distribution state of the above-described electrophoretic particles without applying any voltage, the uneven distribution state being caused by the application of a voltage, and the above-described holding power of the above-described first material is higher than that of the above-described second material.

The present invention also provides an electrophoretic apparatus corresponding to the above-described fourth electrophoretic apparatus, wherein the polarity of the above-described first material is higher than the polarity of the above-described second material.

The present invention also provides an electrophoretic apparatus corresponding to the above-described fourth electrophoretic apparatus, wherein the above-described first component is disposed closer to at least one of the above-described first electrode and the above-described second electrode than is the above-described second component.

The present invention also provides an electrophoretic apparatus corresponding to the above-described fourth electrophoretic apparatus, wherein the above-described first component is disposed in contact with at least one of the above-described first electrode and the above-described second electrode.

The present invention also provides an electrophoretic apparatus corresponding to the above-described fourth electrophoretic apparatus, wherein the above-described electrophoretic particles are titanium dioxide ($TiO_2$) particles, the above-described first material is an acrylic resin, and the above-described second material is a silicone resin.

The present invention also provides an electrophoretic apparatus corresponding to the above-described fourth electrophoretic apparatus, wherein the above-described electrophoretic particles are composed of positively charged particles and negatively charged particles which have colors different from each other.

The present invention also provides an electrophoretic apparatus corresponding to the above-described fourth electrophoretic apparatus, wherein the above-described electrophoretic particles are composed of titanium dioxide ($TiO_2$) particles and colored particles made of acrylic resin, the above-described first material is an acrylic resin, and the above-described second material is a silicone resin.

Examples of the above-described first material (the material constituting the component composed of the above-described mixture in the above-described first and second electrophoretic apparatuses, and the material constituting the above-described first component in the third and fourth electrophoretic apparatuses) include, for example, polyitaconic acid resins, polyvinyl alcohol resins, poly-n-vinyl pyrrolidone resins, polyamide resins, polyurethane resins and acrylic resins. Examples of acrylic resins include, for example, poly-2-ethylhexyl acrylate, polyhydroxyethyl acrylate, polyhydroxypropyl methacrylate, polypropylene glycol acrylate, polyacrylamide and polymethacrylamide.

Examples of the above-described second material (the material constituting the component composed of the above-described mixture in the above-described first and second electrophoretic apparatuses, and the material constituting the above-described second component in the third and fourth electrophoretic apparatuses) include, for example, stearyl methacrylate-acrylonitrile resins, chromium complex resins, polyethylene resins and silicone resins. A fluorine-based compound may be contained as an additive.

A preferable example of combinations of the electrophoretic particle, the first material and the second material is a combination in which the electrophoretic particle is titanium dioxide ($TiO_2$), the first material is an acrylic resin and the second material is a silicone resin. When an electrophoretic suspension of two-particle type is used (when the electrophoretic particles are composed of positively charged particles and negatively charged particles which have colors different from each other), a combination in which the electrophoretic particles are titanium dioxide ($TiO_2$) particles and colored particles made of an acrylic resin, the first material is an acrylic resin and the second material is a silicone resin is preferable.

Examples of combinations of the first material and the second material include a combination of a material having large surface energy and a material having small surface energy. Examples of materials having large surface energy include poly-2-ethylhexyl acrylate, polyacrylic acid, polymethacrylic acid, polyitaconic acid, polyhydroxyethyl acrylate, polyhydroxypropyl methacrylate, polypropylene glycol acrylate, polyacrylamide, polymethacrylamide, polyvinyl alcohol, poly-N-vinyl pyrrolidone and the like.

Examples of materials having small surface energy include silicone resins, stearyl methacrylate-acrylonitrile resins, chromium complex resins and the like.

The present invention provides electronic equipment including the above-described first to fourth electrophoretic apparatuses.

According to the present invention, a microcapsule type electrophoretic display device having an excellent memorization property and excellent eras ability and electronic equipment including the same are provided.

DESCRIPTION OF THE PREFERRED EMBODIMENTS

Embodiments of Electrophoretic Apparatus

Figure 1:
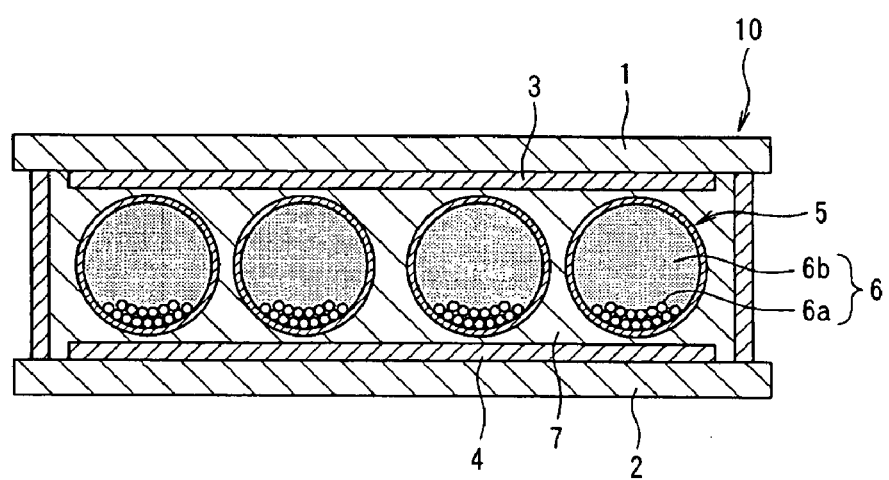
FIG. 1 is a sectional view of one pixel showing the electrophoretic display panel corresponding to the first embodiment of the present invention

The electrophoretic display device, which is an embodiment of the electrophoretic apparatus of the present invention, will be described below.

An electrophoretic display device of the present embodiment is provided with an electrophoretic display panel and a driving circuit. The electrophoretic display panel of the present embodiment will be described with reference to FIG. 1. This drawing is a sectional view of one pixel of the electrophoretic display panel.

This electrophoretic display panel (hereafter abbreviated as "panel") is composed of a first substrate 1 and a second substrate 2 arranged to face each other, a first electrode 3 and a second electrode 4 fixed to opposing surfaces of the respective substrates 1 and 2, microcapsules 5 arranged between the two electrodes 3 and 4, an electrophoretic suspension 6 contained in the microcapsules 5, and a binder 7 for fixing the microcapsules 5 between the two electrodes 3 and 4.

This panel is designed to be observed from the first substrate 1 side. A transparent glass substrate is used as the first substrate, and a patterned ITO (Indium Tin Oxide: $In_2O_3$—$SnO_2$) thin film is used as the first electrode (an electrode formed from a transparent material: transparent electrode) 3. A glass substrate is used as the second substrate 2, and a patterned aluminum (Al) thin film is used as the second electrode 4. The microcapsule 5 is formed from a mixture of gum Arabic and gelatin.

The electrophoretic suspension 6 is composed of electrophoretic particles 6a, made of titanium dioxide particles, and a liquid phase dispersion medium 6b, made of dodecylbenzene, colored by an anthraquinone-based blue dye. The titanium dioxide particles are white particles and are positively charged while being dispersed in dodecylbenzene.

The binder 7 is composed of a mixture of an acryl resin and a silicone resin. This binder 7 corresponds to the "component" constituting the second electrophoretic apparatus of the present invention.

A display method of the electrophoretic display device of the present embodiment will now be described with reference to FIG. 2. As shown in FIG. 2, this electrophoretic display device is composed of the panel 10 shown in FIG. 1 and a driving circuit 20. The driving circuit 20 is provided with a switch 21 and voltage sources 22a and 22b. The first electrode 3 of the panel 10 is connected to the switch 21, and the second electrode 4 is connected to one terminal of each of the voltage sources 22a and 22b.

Figure 2A:
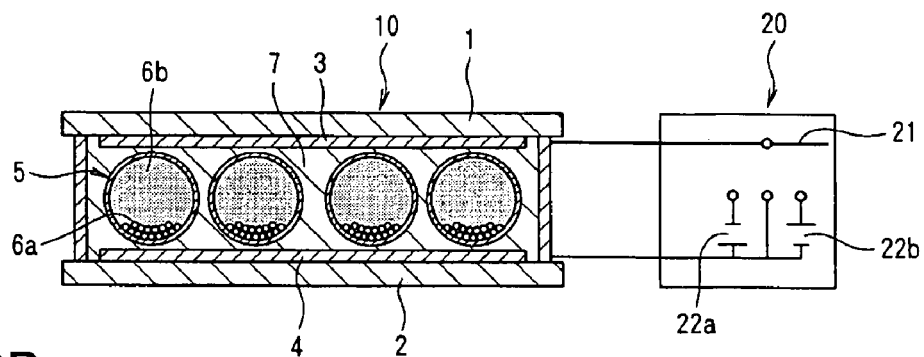
FIG. 2 is a diagram for explaining the displaying method by the electrophoretic display device of the first embodiment.

As shown in FIG. 2(A), when the switch 21 is in an open position and no voltage is applied between the electrodes 3 and 4, the electrophoretic particles 6a in the microcapsule 5 are adjacent the second electrode 4 side (lower position in the drawing) in accordance with gravity. Consequently, the blue liquid phase dispersion medium 6b is observed from the first substrate (transparent substrate) 1 side. That is, the pixel becomes blue in this condition.

Figure 2B:
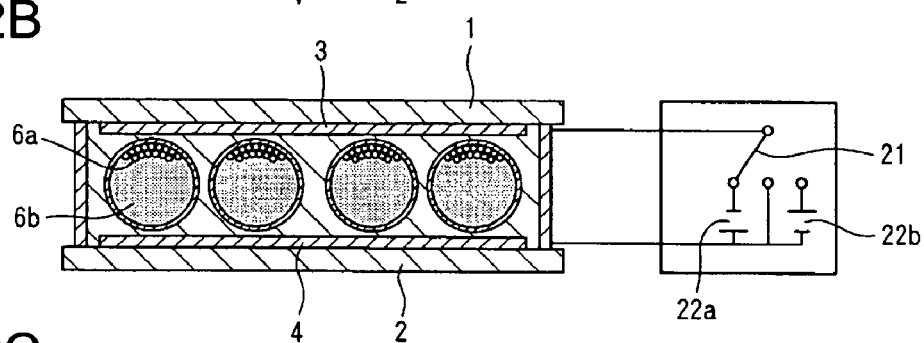

Now, as shown in FIG. 2(B), the switch 21 is connected to the voltage source 22a such that the second electrode 4 becomes positive and the first electrode 3 becomes negative and, thereby, positively charged electrophoretic particles 6a migrate toward the first electrode (transparent electrode) 3 side because the first electrode 3 has become a negative pole. Consequently, the white electrophoretic particles 6a are observed from the first substrate (transparent substrate) 1 side. That is, the pixel becomes white in this condition.

Figure 2C:
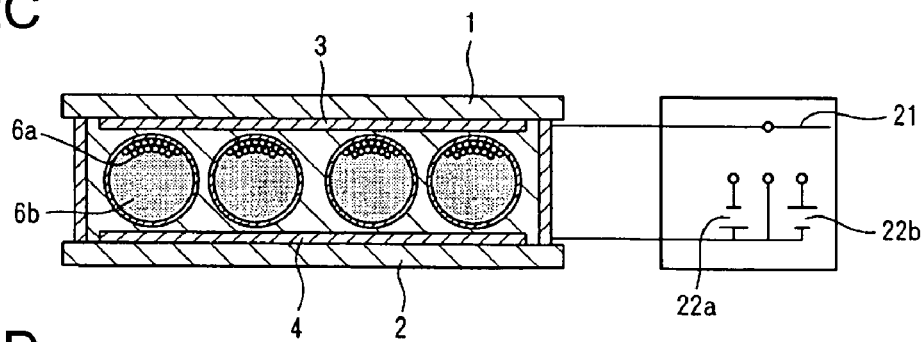

Now, as shown in FIG. 2(C), the switch 21 is in the open position and, thereby, no voltage is applied between the electrodes 3 and 4. However, the electrophoretic particles 6a remain adjacent the first electrode (transparent electrode) 3 side due to a Coulomb force between the negative charge carried by the first electrode (transparent electrode) 3 and the positive charge carried by the electrophoretic particles 6a. Consequently, the white electrophoretic particles 6a are still observed from the first substrate (transparent substrate) 1 side and, therefore, the pixel remains white.

Figure 2D:
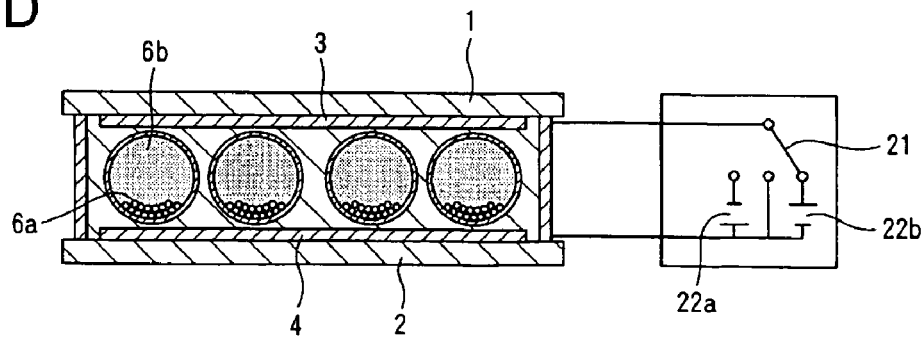

Now, as shown in FIG. 2(D), the switch 21 is connected to the voltage source 22b such that the first electrode 3 becomes positive and the second electrode 4 becomes negative and, thereby, positively charged electrophoretic particles 6a migrate toward the second electrode 4 side because the second electrode 4 has become a negative pole. Consequently, the blue liquid phase dispersion medium 6b is observed from the first substrate (transparent substrate) 1 side. That is, the pixel becomes blue in this condition.

According to the electrophoretic display device of the present embodiment, since a mixture of an acrylic resin that has a high chemical affinity for the electrophoretic particles 6a is made of titanium dioxide, and a silicone resin that has a low chemical affinity for the electrophoretic particles 6a is used as the binder 7, the electrophoretic particles 6a can be held adjacent the first electrode 3 side for, for example, one month or more in the condition shown in FIG. 2(C). When the switch 21 is changed from the condition shown in FIG. 2(C) to the condition shown in FIG. 2(D), the electrophoretic particles 6*a* instantaneously move to the second electrode 4 side.

Therefore, according to the electrophoretic display device of the present embodiment, when the application of a voltage is stopped after an image is displayed by application of the voltage, the displayed image can be held for a long time without disappearance. In addition, erasure of the image can be excellently performed immediately after the switching takes place. That is, the electrophoretic display device of the present embodiment is a microcapsule type electrophoretic apparatus that has an excellent memorization property and an excellent erasability.

In contrast, with respect to the panel 10 in which a silicone resin is used as the binder 7, although the electrophoretic particles 6*a* instantaneously move to the second electrode 4 side when the switch 21 is changed from the condition shown in FIG. 2(C) to the condition shown in FIG. 2(D), the electrophoretic particles 6*a* can be held adjacent the first electrode 3 side only for about 10 minutes in the condition shown in FIG. 2(C).

With respect to the panel 10 in which an acrylic resin is used as the binder 7, although the electrophoretic particles 6*a* can be held adjacent the first electrode 3 side for, for example, six months or more in the condition shown in FIG. 2(C), when the switch 21 is changed from the condition shown in FIG. 2(C) to the condition shown in FIG. 2(D), all of the electrophoretic particles 6*a* do not instantaneously move to the second electrode 4 side in unison and, therefore, it may be observed that white spots remain on a blue background in the resulting state.

Figure 3:
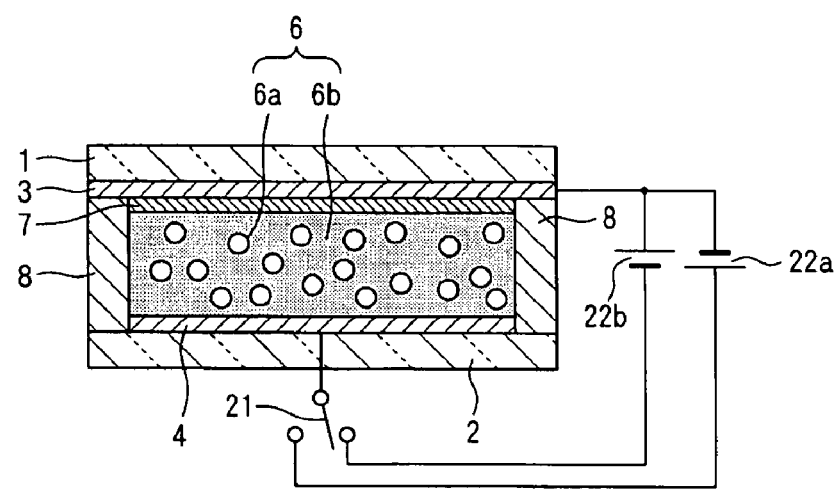
FIG. 3 is a sectional view of one pixel showing the electrophoretic display panel corresponding to the second embodiment of the present invention.

An electrophoretic display device of the second embodiment will now be described with reference to FIG. 3. The electrophoretic display device of the present embodiment is a partition type electrophoretic display device. FIG. 3 is a sectional view of one pixel of an electrophoretic display panel.

Since the electrophoretic display device of the present embodiment is a partition type, in contrast to the electrophoretic display device of the microcapsule type in the first embodiment, an electrophoretic suspension 6 that is composed of electrophoretic particles 6*a* and a liquid phase dispersion medium 6*b* is contained in a space divided by the partitions 8, between the first and second electrodes 3 and 4. Other than this difference, the configuration is basically the same as that in the first embodiment. That is, this electrophoretic display panel (hereafter abbreviated as "panel") is provided with a first substrate 1 and a second substrate 2 that are arranged to face each other, and a first electrode 3 and a second electrode 4 that are fixed to opposing surfaces of the respective substrates 1 and 2.

In this electrophoretic display device, a binder 7 composed of a mixture of an acrylic resin and a silicone resin is provided between a layer composed of the electrophoretic suspension 6 and the first electrode (transparent electrode) 3. This binder 7 corresponds to the "component" constituting the first electrophoretic apparatus of the present invention.

In this device as well, the electrophoretic suspension 6 is composed of electrophoretic particles 6*a* made of titanium dioxide particles and a liquid phase dispersion medium 6*b* made of dodecylbenzene colored by an anthraquinone-based blue dye. The titanium dioxide particles are white particles and are positively charged while dispersed in dodecylbenzene.

In this device, the first electrode 3 on the observation surface side is connected to one terminal of each of the voltage sources 22*a* and 22*b*, and the second electrode 4 is connected to the switch 21. In a manner similar to that in the first embodiment, when the switch 21 is operated the electrophoretic particles 6*a* can be moved to the first electrode 3 side or the second electrode 4 side and, thereby, each pixel can be made white or blue.

According to the electrophoretic display device of the present embodiment, since a mixture of an acrylic resin that has a high chemical affinity for the electrophoretic particles 6*a* made of titanium dioxide, and a silicone resin that has a low chemical affinity for the electrophoretic particles 6*a* is used as the binder 7, when the application of a voltage is stopped after an image is displayed by application of the voltage, the displayed image can be held for a long time without disappearance. In addition, erasure of the image can be excellently performed immediately after the switching takes place. That is, the electrophoretic display device of the present embodiment is a microcapsule type electrophoretic apparatus having an excellent memorization property and an excellent erasability.

An electrophoretic display device of the present embodiment is provided with an electrophoretic display panel and a driving circuit. The electrophoretic display panel of the present embodiment will be described with reference to FIG. 4. This drawing is a sectional view of one pixel of the electrophoretic display panel.

This electrophoretic display panel (hereafter abbreviated as "panel") is composed of a first substrate 1 and a second substrate 2 arranged to face each other, a first electrode 3 and a second electrode 4 fixed to opposing surfaces of the respective substrates 1 and 2, microcapsules 5 arranged between the two electrodes 3 and 4, an electrophoretic suspension 60 contained in the microcapsules 5, and a binder 7 for fixing the microcapsules 5 between the two electrodes 3 and 4.

This panel is designed to be observed from the first substrate 1 side. A transparent glass substrate is used as the first substrate 1, and a patterned ITO (Indium Tin Oxide: $In_2O_3$—$SnO_2$) thin film is used as the first electrode (an electrode formed from a transparent material: transparent electrode) 3. A glass substrate is used as the second substrate 2, and a patterned aluminum (Al) thin film is used as the second electrode 4.

The microcapsule 5 is formed from a mixture of gum Arabic and gelatin.

The electrophoretic suspension 60 is composed of white electrophoretic particles 61 made of titanium dioxide particles, black electrophoretic particles 62 made of acrylic resin particles, and a transparent liquid phase dispersion medium 63 made of dodecylbenzene. That is, electrophoretic particles composed of positively charged particles (acrylic resin particles) and negatively charged particles (titanium dioxide particles), which have colors different from each other, are used in the present embodiment. The binder 7 is composed of a mixture of an acryl resin and a silicone resin. This binder 7 corresponds to the "component" constituting the second electrophoretic apparatus of the present invention.

A display method of the electrophoretic display device of the present embodiment will be described with reference to FIG. 5. As shown in FIG. 5, this electrophoretic display device is composed of the panel 10A shown in FIG. 4 and a driving circuit 20. The driving circuit 20 is provided with a switch 21 and voltage sources 22*a* and 22*b*. The first electrode 3 of the panel 10A is connected to the switch 21, and the second electrode 4 is connected to one terminal of each of the voltage sources 22a and 22b.

Figure 5A:
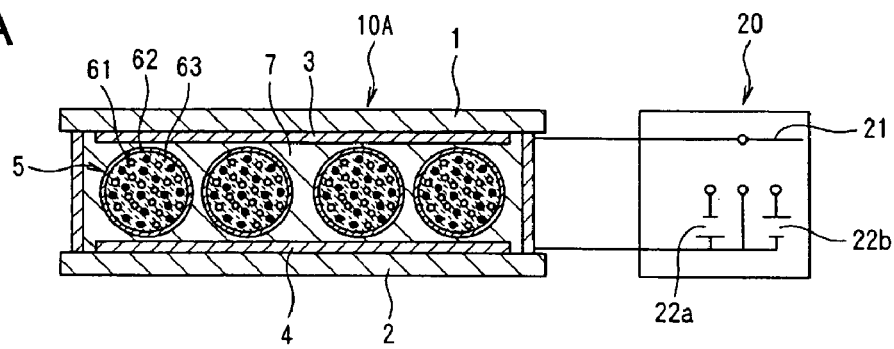
FIG. 5 is a diagram for explaining the displaying method by the electrophoretic display device of the third embodiment.

As shown in FIG. 5(A), when the switch 21 is in an open position and no voltage is applied between the electrodes 3 and 4, the electrophoretic particles 61 and 62 in the microcapsule 5 are uniformly dispersed in the liquid phase dispersion medium 63. Consequently, the liquid phase dispersion medium 63, in a condition in which electrophoretic particles 61 and 62 are uniformly dispersed, is observed from the first substrate (transparent substrate) 1 side. That is, this pixel becomes transparent (in a strict sense, light gray) in this condition.

Figure 5B:
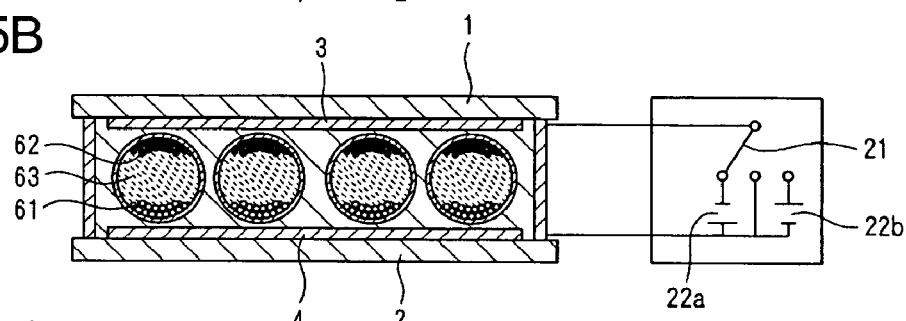

Now, as shown in FIG. 5(B), the switch 21 is connected to the voltage source 22a such that the second electrode 4 becomes positive and the first electrode 3 becomes negative and, thereby, the positively charged black electrophoretic particles 62 migrate toward the first electrode (transparent electrode) 3 side because the first electrode 3 has become a negative pole. The negatively charged white electrophoretic particles 61 migrate toward the second electrode 4 side because the second electrode 4 has become a positive pole. Consequently, the black electrophoretic particles 62 are observed from the first substrate (transparent substrate) 1 side. That is, this pixel becomes black in this condition.

Figure 5C:
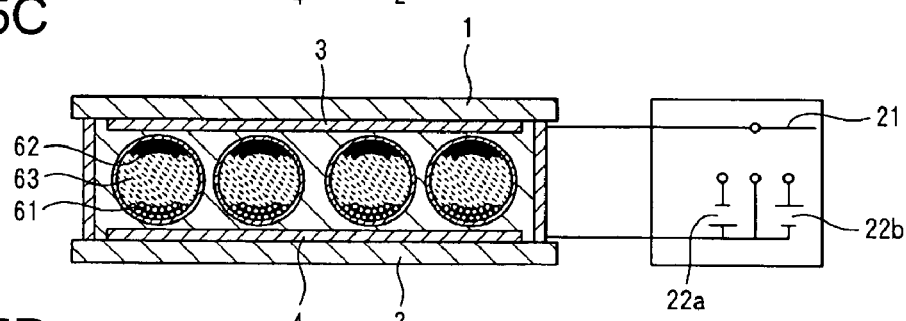

Following this condition, as shown in FIG. 5(C), the switch 21 is switched to be in the open position and, thereby, no voltage is applied between the electrodes 3 and 4. However, the electrophoretic particles 62 remain adjacent the first electrode (transparent electrode) 3 side due to a Coulomb force between the negative charge carried by the first electrode (transparent electrode) 3 and the positive charge carried by the electrophoretic particles 62. The electrophoretic particles 61 remain adjacent the second electrode 4 side due to a Coulomb force between the positive charge carried by the second electrode 4 and the negative charge carried by the electrophoretic particles 61. Consequently, the black electrophoretic particles 62 are still observed from the first substrate (transparent substrate) 1 side and, therefore, this pixel remains black.

Figure 5D:
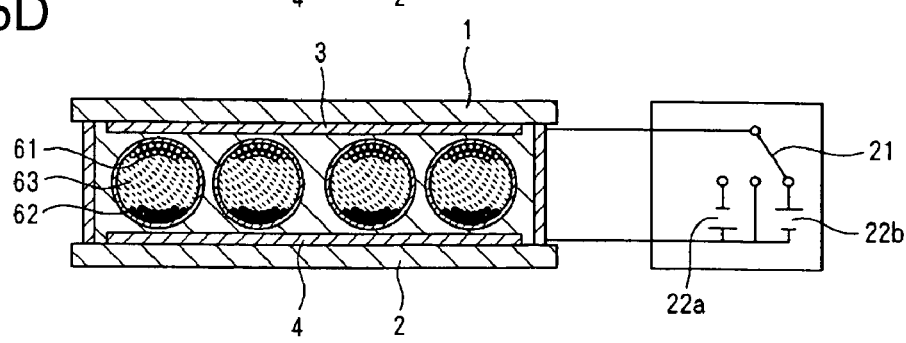

Now, as shown in FIG. 5(D), the switch 21 is connected to the voltage source 22b such that the first electrode 3 becomes positive and the second electrode 4 becomes negative and, thereby, the positively charged black electrophoretic particles 62 migrate toward the second electrode 4 side because the second electrode 4 has become a negative pole. The negatively charged white electrophoretic particles 61 migrate toward the first electrode (transparent electrode) 3 side because the first electrode 3 has become a positive pole. Consequently, the white electrophoretic particles 61 are observed from the first substrate (transparent substrate) 1 side. That is, this pixel becomes white in this condition.

Since a mixture of an acrylic resin that has a high chemical affinity for the electrophoretic particles 61, made of titanium dioxide, and the electrophoretic particles 62, made of an acrylic resin, and a silicone resin that has a low chemical affinity for the electrophoretic particles 61 is used as the binder 7, the electrophoretic particles 62 can be adjacent the first electrode 3 side and the electrophoretic particles 61 can be adjacent the second electrode 4 side for, for example, one month or more in the condition shown in FIG. 5(C). When the switch 21 is changed from the condition shown in FIG. 5(C) to the condition shown in FIG. 5(D), however, the electrophoretic particles 62 instantaneously move to the second electrode 4 side and the electrophoretic particles 61 instantaneously move to the first electrode 3 side, in unison.

As such, when the application of a voltage is stopped after an image is displayed, the displayed image can be held for a long time without it disappearing. In addition, erasure of the image can be excellently performed immediately after the switching takes place. That is, the electrophoretic display device of the present embodiment is a microcapsule type electrophoretic apparatus having an excellent memorization property and an excellent erasability.

In contrast, with respect to the panel 10A in which a silicone resin is used as the binder 7, although the electrophoretic particles 62 instantaneously move to the second electrode 4 side and the electrophoretic particles 61 instantaneously move to the first electrode 3 side when the switch 21 is changed from the condition shown in FIG. 5(C) to the condition shown in FIG. 5(D), the electrophoretic particles 62 can be adjacent the first electrode 3 side and the electrophoretic particles 61 can be adjacent the second electrode 4 side only for about 10 minutes, in the condition shown in FIG. 5(C).

With respect to the panel 10A in which an acrylic resin is used as the binder 7, although the electrophoretic particles 62 can be adjacent the first electrode 3 side and the electrophoretic particles 61 can be adjacent the second electrode 4 side for, for example, six months or more in the condition shown in FIG. 5(C), when the switch 21 is changed from the condition shown in FIG. 5(C) to the condition shown in FIG. 5(D), all of the electrophoretic particles 62 do not instantaneously move to the second electrode 4 side in unison and all of the electrophoretic particles 61 do not instantaneously move to the first electrode 3 side in unison and, therefore, it may be observed that white spots remain in a black background in the resulting state.

Figure 6:
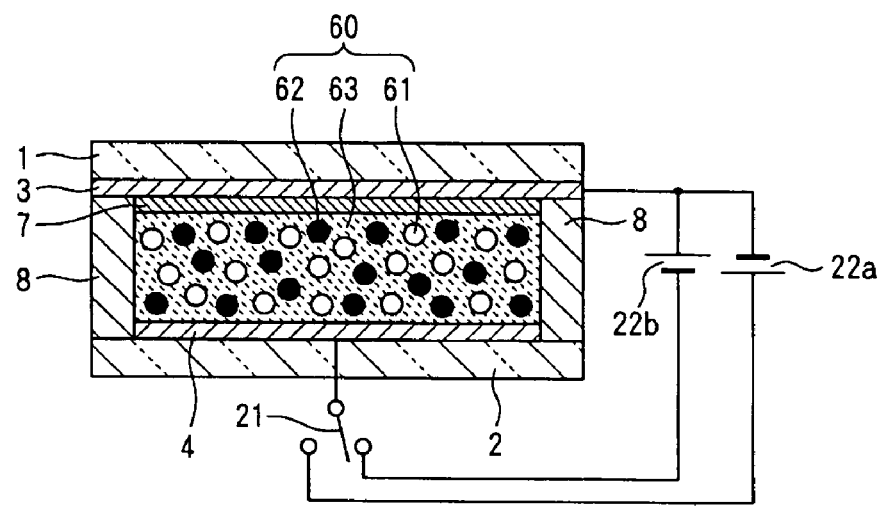
FIG. 6 is a sectional view of one pixel showing the electrophoretic display panel corresponding to the fourth embodiment of the present invention.

An electrophoretic display device of the fourth embodiment will now be described with reference to FIG. 6. The electrophoretic display device of the present embodiment is a partition type electrophoretic display device. FIG. 6 is a sectional view of one pixel of an electrophoretic display panel.

Since the electrophoretic display device of the present embodiment is a partition type, in contrast to the electrophoretic display device of the microcapsule type in the third embodiment, an electrophoretic suspension 60 composed of electrophoretic particles 61 and 62 and a liquid phase dispersion medium 63 is contained in a space divided by partitions 8 between the first and second electrodes 3 and 4. The configuration, other than this difference, is basically the same as that in the third embodiment. That is, this electrophoretic display panel (hereafter abbreviated as "panel") is provided with a first substrate 1 and a second substrate 2 arranged to face each other, and a first electrode 3 and a second electrode 4 fixed to opposing surfaces of the respective substrates 1 and 2.

In this electrophoretic display device, a binder 7 composed of a mixture of an acrylic resin, and a silicone resin is provided between a layer composed of the electrophoretic suspension 60 and the first electrode (transparent electrode) 3. This binder 7 corresponds to the "component" constituting the first electrophoretic apparatus of the present invention.

In this device as well, the electrophoretic suspension 60 is composed of white electrophoretic particles 61 made of titanium dioxide particles, black electrophoretic particles 62 made of acrylic resin particles, and a transparent liquid phase dispersion medium 63 made of dodecylbenzene. That is, electrophoretic particles composed of positively charged particles (acrylic resin particles) and negatively charged particles (titanium dioxide particles), which have colors different from each other, are used in the present embodiment.

In this device, the first electrode 3 on the observation surface side is connected to one terminal of each of the voltage sources 22a and 22b, and the second electrode 4 is connected to the switch 21. In a manner similar to that in the first embodiment, the switch 21 is operated, the electrophoretic particles 61 are moved to the first electrode 3 side or the second electrode 4 side, and each pixel can be made white or black.

According to the electrophoretic display device of the present embodiment, since a mixture of an acrylic resin that has a high chemical affinity for the electrophoretic particles 61 made of titanium dioxide, and the electrophoretic particles 62 is made of an acrylic resin and a silicone resin that has a low chemical affinity therefor is used as the binder 7, when the application of a voltage is stopped after an image is displayed by application of the voltage, the displayed image can be held for a long time without disappearing. In addition, erasure of the image can be excellently performed immediately after the switching takes place. That is, the electrophoretic display device of the present embodiment is a microcapsule type electrophoretic apparatus having an excellent memorization property and an excellent erasability.

An electrophoretic display device of the fifth embodiment is provided with an electrophoretic display panel and a driving circuit. The electrophoretic display panel of the present embodiment will be described with reference to FIG. 7. This drawing is a sectional view of one pixel of the electrophoretic display panel.

This electrophoretic display panel (hereafter abbreviated as "panel") is composed of a first substrate 1 and a second substrate 2 arranged to face each other, a first electrode 3 and a second electrode 4 fixed to opposing surfaces of the respective substrates 1 and 2, microcapsules 5 arranged between the two electrodes 3 and 4, an electrophoretic suspension 6 contained in the microcapsules 5, and first and second binders 71 and 72 for fixing the microcapsules 5 between the two electrodes 3 and 4.

This panel is designed to be observed from the first substrate 1 side. A transparent glass substrate is used as the first substrate 1, and a patterned ITO (Indium Tin Oxide: $In_2O_3$—$SnO_2$) thin film is used as the first electrode (an electrode formed from a transparent material: transparent electrode) 3. A glass substrate is used as the second substrate 2, and a patterned aluminum (Al) thin film is used as the second electrode 4. The microcapsule 5 is formed from a mixture of gum Arabic and gelatin.

The electrophoretic suspension 6 is composed of electrophoretic particles 6a, made of titanium dioxide particles, and a liquid phase dispersion medium 6b, made of dodecylbenzene, colored by an anthraquinone-based blue dye. The titanium dioxide particles are white particles and are positively charged while being dispersed in dodecylbenzene.

The first binder 71 is made of an acrylic resin and is formed into a laminar shape all over the surface (the surface opposite to the first substrate 1 side) of the first electrode 3. The second binder 72 is made of a silicone resin and is disposed to fill in the space enclosed by the second electrode 4, the layer made of the first binder 71, and the microcapsules 5 in one pixel. That is, in the laminar material, a plurality of microcapsules 5 are arranged such that one microcapsule is disposed in the thickness direction, and are fixed with the second binder 72. The laminar material is fixed to the first electrode 3 with the first binder 71, and is fixed to the second electrode 4 with the second binder 72.

This first binder 71 corresponds to the "first component" constituting the fourth electrophoretic apparatus of the present invention, and the second binder 72 corresponds to the "second component" constituting the fourth electrophoretic apparatus of the present invention.

A display method of the electrophoretic display device of the present embodiment will now be described with reference to FIG. 8. As shown in FIG. 8, this electrophoretic display device is composed of the panel 10B shown in FIG. 8 and a driving circuit 20. The driving circuit 20 is provided with a switch 21 and voltage sources 22a and 22b. The first electrode 3 of the panel 10B is connected to the switch 21, and the second electrode 4 is connected to one terminal of each of the voltage sources 22a and 22b.

Figure 8A:
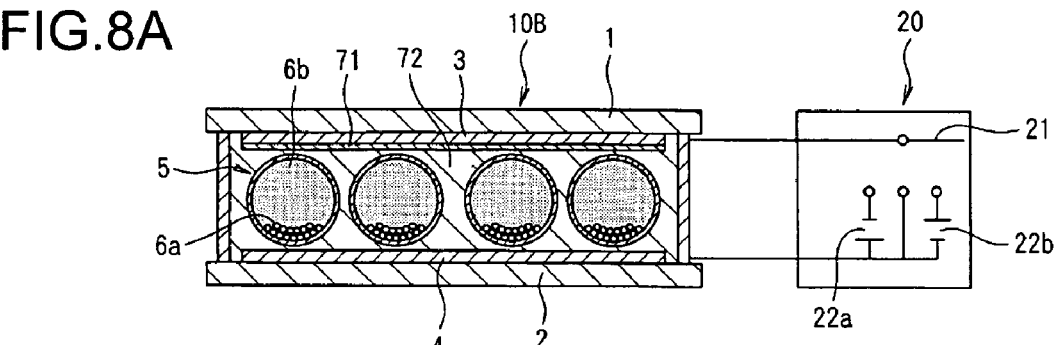
FIG. 8 is a diagram for explaining the displaying method by the electrophoretic display device of the fifth embodiment.

As shown in FIG. 8(A), when the switch 21 is in the open position, and no voltage is applied between the electrodes 3 and 4, the electrophoretic particles 6a in the microcapsule 5 are adjacent the second electrode 4 side (lower position in the drawing) in accordance with gravity. Consequently, the blue liquid phase dispersion medium 6b is observed from the first substrate (transparent substrate) 1 side. That is, the pixel becomes blue in this condition.

Figure 8B:
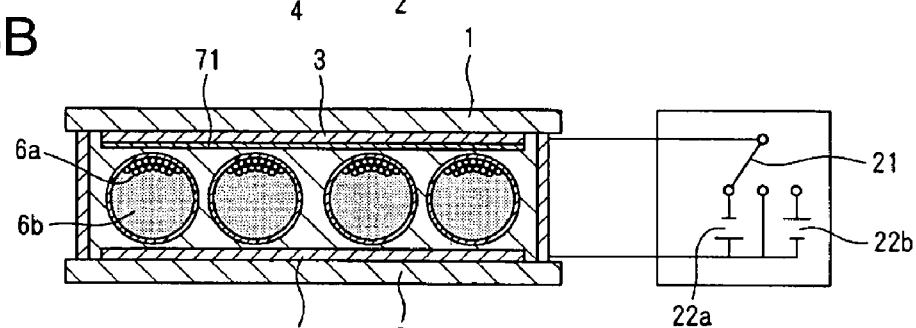

Now, as shown in FIG. 8(B), the switch 21 is connected to the voltage source 22a in order that the second electrode 4 becomes positive and the first electrode 3 becomes negative and, thereby, positively charged electrophoretic particles 6a migrate toward the first electrode (transparent electrode) 3 side, because the first electrode 3 has become a negative pole. Consequently, the white electrophoretic particles 6a are observed from the first substrate (transparent substrate) 1 side. That is, this pixel becomes white in this condition.

Figure 8C:
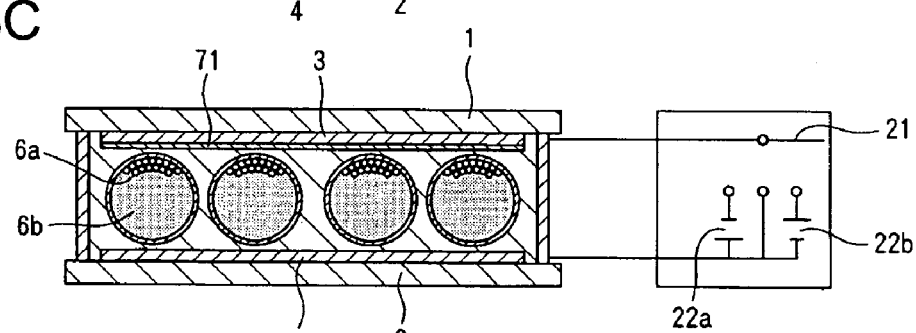

Following this condition, as shown in FIG. 8(C), the switch 21 is in the open position and, thereby, no voltage is applied between the electrodes 3 and 4 in the resulting condition. However, the electrophoretic particles 6a remain adjacent the first electrode (transparent electrode) 3 side due to a Coulomb force between the negative charge carried by the first electrode (transparent electrode) 3 and the positive charge carried by the electrophoretic particles 6a. Consequently, the white electrophoretic particles 6a are still observed from the first substrate (transparent substrate) 1 side and, therefore, this pixel remains white.

Figure 8D:
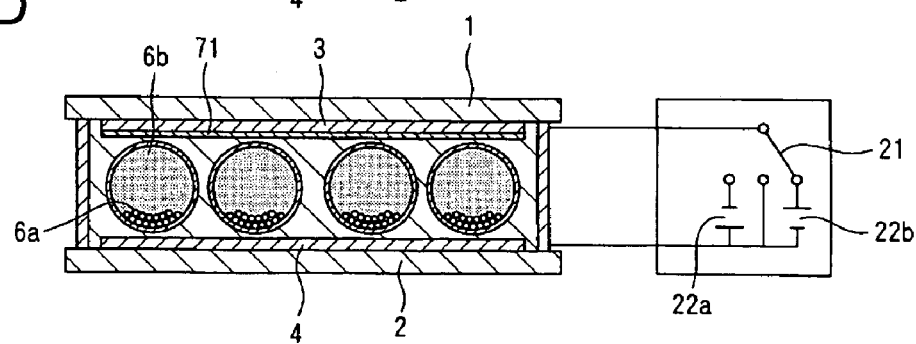

Now, as shown in FIG. 8(D), the switch 21 is connected to the voltage source 22b such that the first electrode 3 becomes positive and the second electrode 4 becomes negative and, thereby, the positively charged electrophoretic particles 6a migrate toward the second electrode 4 side because the second electrode 4 has become a negative pole. Consequently, the blue liquid phase dispersion medium 6b is observed from the first substrate (transparent substrate) 1 side. That is, this pixel becomes blue in this condition.

Since the first binder 71 is made of an acrylic resin that has a high chemical affinity for the electrophoretic particles 6a made of titanium dioxide and is formed into a laminar shape on the first electrode 3, and the second binder 72 is made of a silicone resin that has a low chemical affinity therefor is used to fix between microcapsules 5 adjacent to each other, the electrophoretic particles 6a can be held in the first electrode 3 side for, for example, one month or more in the condition shown in FIG. 8(C). When the switch 21 is changed from the condition shown in FIG. 8(C) to the condition shown in FIG. 8(D), the electrophoretic particles 6a instantaneously move to the second electrode 4 side, in unison.

As such, when the application of a voltage is stopped after an image is displayed by application of the voltage, the displayed image can be held for a long time without disappearing. In addition, erasure of the image can be excellently performed immediately after the switching takes place. That is, the electrophoretic display device of the present embodiment is a microcapsule type electrophoretic apparatus having an excellent memorization property and an excellent erasability.

In contrast, with respect to a panel which differs simply in that there is no layer made of the first binder 71 is disposed therein, although the electrophoretic particles 6a instantaneously move to the second electrode 4 side when the switch 21 is changed from the condition shown in FIG. 8(C) to the condition shown in FIG. 8(D), the electrophoretic particles 6a can be adjacent the first electrode 3 side only for about 10 minutes in the condition shown in FIG. 8(C).

With respect to a panel in which no layer made of the first binder 71 is disposed therein, and an acrylic resin is used as the second binder 72, although the electrophoretic particles 6a can be adjacent the first electrode 3 side for, for example, six months or more in the condition shown in FIG. 8(C), when the switch 21 is changed from the condition shown in FIG. 8(C) to the condition shown in FIG. 8(D), all of the electrophoretic particles 6a do not instantaneously move to the second electrode 4 side in unison and, therefore, it may be observed that white spots remain in a blue background.

Figure 9:
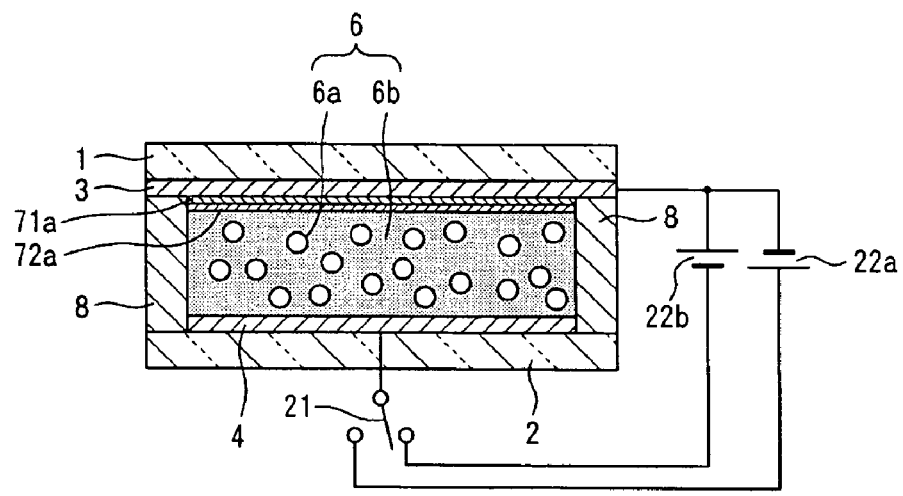
FIG. 9 is a sectional view of one pixel showing the electrophoretic display panel corresponding to the sixth embodiment of the present invention.

An electrophoretic display device of the sixth embodiment will now be described with reference to FIG. 9. The electrophoretic display device of the present embodiment is a partition type electrophoretic display device. FIG. 9 is a sectional view of one pixel of an electrophoretic display panel.

Since the electrophoretic display device of the present embodiment is a partition type, in contrast to the electrophoretic display device of the microcapsule type in the fifth embodiment, an electrophoretic suspension 6 composed of electrophoretic particles 6a and a liquid phase dispersion medium 6b is contained in the space divided by the partitions 8 between the first and second electrodes 3 and 4. The configuration, other than this difference, is basically the same as that in the fifth embodiment. That is, this electrophoretic display panel (hereafter abbreviated as "panel") is provided with a first substrate 1 and a second substrate 2 arranged to face each other, and a first electrode 3 and a second electrode 4 are fixed to opposing surfaces of the respective substrates 1 and 2.

In this electrophoretic display device, a first layer 71a, made of an acrylic resin, and a second layer 72a, made of a silicone resin, are provided between the layer made of the electrophoretic suspension 6 and the first electrode (transparent electrode) 3, in that order, from the first electrode 3 side. This first layer 71a corresponds to the "first component" constituting the third electrophoretic apparatus of the present invention, and the second layer 72a corresponds to the "second component" constituting the fourth electrophoretic apparatus of the present invention.

In this device as well, the electrophoretic suspension 6 is composed of electrophoretic particles 6a, made of titanium dioxide particles, and a liquid phase dispersion medium 6b, made of dodecylbenzene, colored by an anthraquinone-based blue dye. The titanium dioxide particles are white particles and are positively charged while being dispersed in dodecylbenzene.

In this device, the first electrode 3 on the observation surface side is connected to one terminal of each of the voltage sources 22a and 22b, and the second electrode 4 is connected to the switch 21. In a manner similar to that in the first embodiment, the switch 21 is operated, the electrophoretic particles 6a are moved to the first electrode 3 side or the second electrode 4 side, and each pixel can be made white or blue.

Since the first layer 71 is made of an acrylic resin that has a high chemical affinity for the electrophoretic particles 6a made of titanium dioxide, and the second layer 72 made of a silicone resin has a low chemical affinity therefor are provided between the layer made of the electrophoretic suspension 6 and the first electrode (transparent electrode) 3, in that order, from the first electrode 3 side, when the application of a voltage is stopped after an image is displayed by application of the voltage, the displayed image can be held for a long time without disappearing. In addition, erasure of the image can be excellently performed immediately after the switching takes place. That is, the electrophoretic display device of the present embodiment is a microcapsule type electrophoretic apparatus having an excellent memorization property and an excellent erasability.

An electrophoretic display device of the seventh embodiment is provided with an electrophoretic display panel and a driving circuit. The electrophoretic display panel of the present embodiment will be described with reference to FIG. 10. This drawing is a sectional view of one pixel of the electrophoretic display panel.

This electrophoretic display panel (hereafter abbreviated as "panel") is composed of a first substrate 1 and a second substrate 2 arranged to face each other, a first electrode 3 and a second electrode 4 fixed to opposing surfaces of the respective substrates 1 and 2, microcapsules 5 arranged between the two electrodes 3 and 4, electrophoretic suspensions 60 contained in the microcapsules 5, and first and second binders 71 and 72 for fixing the microcapsules 5 between the two electrodes 3 and 4.

This panel is designed to be observed from the first substrate 1 side. A transparent glass substrate is used as the first substrate 1, and a patterned ITO (Indium Tin Oxide: $In_2O_3$—$SnO_2$) thin film is used as the first electrode (an electrode formed from a transparent material: transparent electrode) 3. A glass substrate is used as the second substrate 2, and a patterned aluminum (Al) thin film is used as the second electrode 4. The microcapsule 5 is formed from a mixture of gum Arabic and gelatin.

The electrophoretic suspension 60 is composed of white electrophoretic particles 61 made of titanium dioxide particles, black electrophoretic particles 62 made of acrylic resin particles and a transparent liquid phase dispersion medium 63 made of dodecylbenzene. That is, electrophoretic particles composed of positively charged particles (acrylic resin particles) and negatively charged particles (titanium dioxide particles) which have colors different from each other are used in the present embodiment.

The first binder 71 is made of an acrylic resin, and is formed into a laminar shape all over the surface (the surface opposite to the first substrate 1 side) of the first electrode 3. The second binder 72 is made of a silicone resin, and is disposed to fill in the space enclosed by the second electrode 4, the layer made of the first binder 71, and the microcapsules 5 in one pixel. That is, in a laminar material, a plurality of microcapsules 5 are arranged such that one microcapsule is disposed in the thickness direction, and are fixed with the second binder 72. The laminar material is fixed to the first electrode 3 with the first binder 71, and is fixed to the second electrode 4 with the second binder 72.

This first binder 71 corresponds to the "first component" constituting the fourth electrophoretic apparatus of the present invention, and the second binder 72 corresponds to the "second component" constituting the fourth electrophoretic apparatus of the present invention.

A display method of the electrophoretic display device of the present embodiment will now be described with reference to FIG. 11. As shown in FIG. 11, this electrophoretic display device is composed of the panel 10C shown in FIG. 10 and a driving circuit 20. The driving circuit 20 is provided with a switch 21 and voltage sources 22a and 22b. The first electrode 3 of the panel 10C is connected to the switch 21, and the second electrode 4 is connected to one terminal of each of the voltage sources 22a and 22b.

Figure 11A:
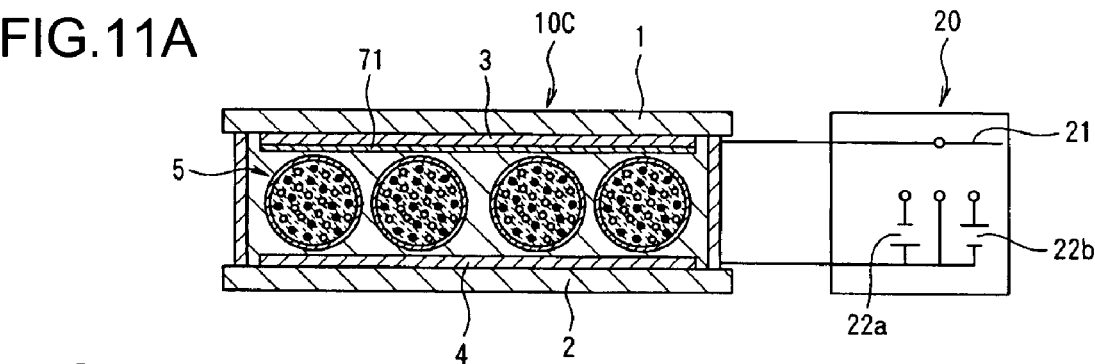
FIG. 11 is a diagram for explaining the displaying method by the electrophoretic display device of the seventh embodiment.

As shown in FIG. 11(A), when the switch 21 is in the open position and no voltage is applied between the electrodes 3 and 4, the electrophoretic particles 61 and 62 in the microcapsule 5 are uniformly dispersed in the liquid phase dispersion medium 63. Consequently, the liquid phase dispersion medium 63, in the condition in which electrophoretic particles 61 and 62 are uniformly dispersed, is observed from the first substrate (transparent substrate) 1 side. That is, this pixel becomes transparent (in a strict sense, light gray) in this condition.

Figure 11B:
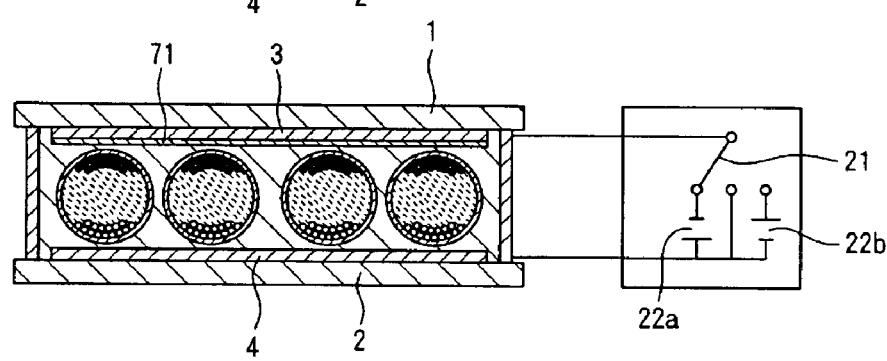

Following this condition, as shown in FIG. 11(B), the switch 21 is connected to the voltage source 22a such that the second electrode 4 becomes positive and the first electrode 3 becomes negative and, thereby, positively charged black electrophoretic particles 62 migrate toward the first electrode (transparent electrode) 3 side because the first electrode 3 has become a negative pole. Negatively charged white electrophoretic particles 61 migrate toward the second electrode 4 side because the second electrode 4 has become a positive pole. Consequently, the black electrophoretic particles 62 are observed from the first substrate (transparent substrate) 1 side. That is, this pixel becomes black in this condition.

Figure 11C:
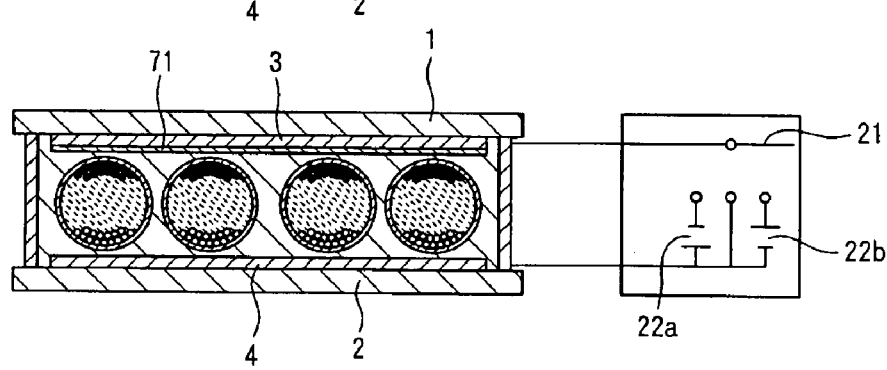

Following this condition, as shown in FIG. 11(C), the switch 21 is switched to the open position and no voltage is applied between the electrodes 3 and 4 in the resulting condition. However, the electrophoretic particles 62 remain adjacent the first electrode (transparent electrode) 3 side due to a Coulomb force between the negative charge carried by the first electrode (transparent electrode) 3 and the positive charge carried by the electrophoretic particles 62. The electrophoretic particles 61 remain adjacent the second electrode 4 side due to a Coulomb force between the positive charge carried by the second electrode 4 and the negative charge carried by the electrophoretic particles 61. Consequently, the black electrophoretic particles 62 are still observed from the first substrate (transparent substrate) 1 side and, therefore, this pixel remains black.

Figure 11D:
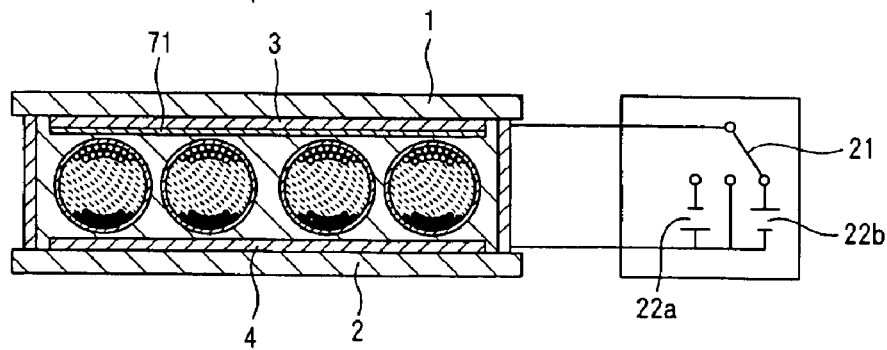

Following this condition, as shown in FIG. 11(D), the switch 21 is connected to the voltage source 22b such that the first electrode 3 becomes positive and the second electrode 4 becomes negative and, thereby, positively charged black electrophoretic particles 62 migrate toward the second electrode 4 side because the second electrode 4 has become a negative pole. Negatively charged white electrophoretic particles 61 migrate toward the first electrode (transparent electrode) 3 side because the first electrode 3 has become a positive pole. Consequently, the white electrophoretic particles 61 are observed from the first substrate (transparent substrate) 1 side. That is, the pixel becomes white in this condition.

Since the first binder 71 made of an acrylic resin has high chemical affinity for the electrophoretic particles 6a made of titanium dioxide is formed into a laminar shape on the first electrode 3, and the second binder 72 made of a silicone resin has low chemical affinity therefor is used to fix between microcapsules 5 adjacent to each other, the electrophoretic particles 62 can be adjacent the first electrode 3 side and the electrophoretic particles 61 can be adjacent the second electrode 4 side for, for example, one month or more in the condition shown in FIG. 11(C). When the switch 21 is changed from the condition shown in FIG. 11(C) to the condition shown in FIG. 11(D), the electrophoretic particles 62 instantaneously move to the second electrode 4 side and the electrophoretic particles 61 instantaneously move to the first electrode 3 side, in unison.

As such, when the application of a voltage is stopped after an image is displayed by application of the voltage, the displayed image can be held for a long time without disappearing. In addition, erasure of the image can be excellently performed immediately after the switching takes place. That is, the electrophoretic display device of the present embodiment is a microcapsule type electrophoretic apparatus having an excellent memorization property and an excellent erasability.

In contrast, with respect to a panel which differs simply in that no layer made of the first binder 71 is disposed, although the electrophoretic particles 62 instantaneously move to the second electrode 4 side and the electrophoretic particles 61 instantaneously move to the first electrode 3 side when the switch 21 is changed from the condition shown in FIG. 11(C) to the condition shown in FIG. 11(D), the electrophoretic particles 62 can be adjacent the first electrode 3 side and the electrophoretic particles 61 can be adjacent the second electrode 4 side only for about 10 minutes in the condition shown in FIG. 11(C).

With respect to a panel in which no layer made of the first binder 71 is disposed and an acrylic resin is used as the second binder 72, although the electrophoretic particles 62 can be adjacent the first electrode 3 side and the electrophoretic particles 61 can be adjacent the second electrode 4 side for, for example, six months or more in the condition shown in FIG. 11(C), when the switch 21 is changed from the condition shown in FIG. 11(C) to the condition shown in FIG. 11(D), all of the electrophoretic particles 62 do not instantaneously move to the second electrode 4 side in unison and all of the electrophoretic particles 61 do not instantaneously move to the first electrode 3 side in unison and, therefore, it may be observed that white spots remain in a black background in the resulting state.

Figure 12:
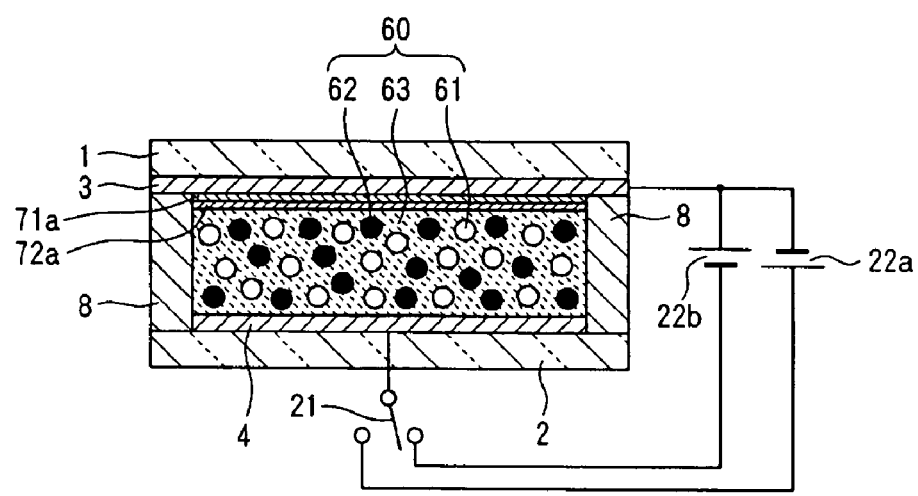
FIG. 12 is a sectional view of one pixel showing the electrophoretic display panel corresponding to the eighth embodiment of the present invention.

An electrophoretic display device of the eighth embodiment will now be described with reference to FIG. 12. The electrophoretic display device of the present embodiment is a partition type electrophoretic display device. FIG. 12 is a sectional view of one pixel of an electrophoretic display panel.

Since the electrophoretic display device of the present embodiment is a partition type, in contrast to the electrophoretic display device of the microcapsule type in the seventh embodiment, an electrophoretic suspension 60 composed of electrophoretic particles 61 and 62 and a liquid phase dispersion medium 63 is contained in a space divided by partitions 8 between the first and second electrodes 3 and 4. The configuration, other than this difference, is basically the same as that in the third embodiment. That is, this electrophoretic display panel (hereafter abbreviated as "panel") is provided with a first substrate 1 and a second substrate 2 arranged to face each other, and a first electrode 3 and a second electrode 4 fixed to opposing surfaces of the respective substrates 1 and 2.

In this electrophoretic display device, a first layer 71a made of an acrylic resin and a second layer 72a made of a silicone resin are provided between the layer made of the electrophoretic suspension 60 and the first electrode (transparent electrode) 3, in that order, from the first electrode 3 side. This first layer 71a corresponds to the "first component" constituting the third electrophoretic apparatus of the present invention, and the second layer 72a corresponds to the "second component" constituting the fourth electrophoretic apparatus of the present invention.

In this device as well, the electrophoretic suspension 60 is composed of white electrophoretic particles 61 made of titanium dioxide particles, black electrophoretic particles 62 made of acrylic resin particles, and a transparent liquid phase dispersion medium 63 made of dodecylbenzene. That is, electrophoretic particles composed of positively charged particles (acrylic resin particles) and negatively charged particles (titanium dioxide particles), which have colors different from each other, are used in the present embodiment.

In this device, the first electrode 3, on the observation surface side, is connected to one terminal of each of the voltage sources 22a and 22b, and the second electrode 4 is connected to the switch 21. In a manner similar to that in the first embodiment, the switch 21 is operated, the electrophoretic particles 61 and 62 are moved to the first electrode 3 side or the second electrode 4 side, and each pixel can be made white or black.

According to the electrophoretic display device of the present embodiment, since the first layer 71a made of an acrylic resin has a high chemical affinity for the electrophoretic particles 61 made of titanium dioxide, and the second layer 72a made of a silicone resin has a low chemical affinity therefor are provided between the layer made of the electrophoretic suspension 60 and the first electrode (transparent electrode) 3, in that order, from the first electrode 3 side, when the application of a voltage is stopped after an image is displayed by application of the voltage, the displayed image can be held for a long time without disappearing. In addition, erasure of the image can be excellently performed immediately after the switching takes place. That is, the electrophoretic display device of the present embodiment is a microcapsule type electrophoretic apparatus having an excellent memorization property and an excellent erasability.

As constituent materials and the like for the electrophoretic apparatus, other than those materials used and described in the above-described embodiments, a variety of materials can be used. The following are exemplifications thereof.

The first substrate 1 disposed on the observation side is essentially a transparent (having a light transmission property) substrate. For example, a resin film of polyethylene terephthalate (PET), polyethersulfone (PES) or the like, or a quartz substrate can be used in addition to the transparent glass substrate. The second substrate 2 is not necessarily a transparent substrate and, therefore, a metal plate or the like can also be used therefor.

The first electrode 3 disposed on the observation side is essentially a transparent (having a light transmission property) electrode, and an IDIXO ($In_2O_3$—ZnO) thin film and the like can be used in addition to the ITO thin film. As the second electrode 4, a thin film made of a metal, for example, gold (Au), platinum (Pt), silver (Ag), nickel (Ni), titanium (Ti) or chromium (Cr), can be used in addition to the aluminum thin film.

As the electrophoretic particles 6a, colored particles capable of being charged in an insulating liquid phase dispersion medium are used. For example, white aluminum oxide ($Al_2O_3$) particles, particles made of colored synthetic resins (polyethylene resin, polystyrene resin or acrylic resin), those in which a metal film of aluminum, silver or the like is formed on a synthetic resin can be used in addition to the titanium dioxide ($TiO_2$) particles. Furthermore, preferably, particles which have been surface-treated with a surfactant, a dispersing agent and the like are used in order to suppress occurrence of coagulation and reduce to the specific gravity.

Examples of colorants for the electrophoretic particles 6a include any one of, or a mixture of at least two of black pigments. For example, aniline black and carbon black; white pigments such as zinc white and antimony trioxide; azo pigments such as monoazo, disazo and polyazo; yellow pigments such as isoindolinone, chrome yellow, yellow iron oxide, cadmium yellow, titanium yellow and antimony; red pigments such as quinacridone red and chrome vermilion; blue pigments, such as iron blue, ultramarine and cobalt blue; green pigments such as phthalocyanine green; phthalocyanine blue, indanthrene blue, anthraquinone dyes and the like.

As necessary, a charge-controlling agent composed of particles of metal soap, resin, rubber, oil, varnish, compound and the like; a dispersing agent such as a titanium-based coupling agent, an aluminum-based coupling agent or a silane-based coupling agent; an electrolyte, a surfactant, a lubricant, a stabilizer and the like may be added to the above-described pigment.

As the liquid phase dispersion medium 6b, an insulating liquid, for example, a substantially water-insoluble organic solvent, is used in which the electrophoretic particles 6a are likely to be charged, and the charged state is stabilized. Examples of the above-described solvents include any one of long chain alcohol-based solvents such as dodecanol and undecanol; multicarbon ketones such as dibutyl ketone and methyl isobutyl ketone; aliphatic hydrocarbons such as pentane, hexane and octane; alicyclic hydrocarbons such as cyclohexane and methylcyclohexane; aromatic hydrocarbons such as benzene, toluene, xylene, hexylbenzene, heptylbenzene, octylbenzene, nonylbenzene, decylbenzene, undecylbenzene, dodecylbenzene, tridecylbenzene, tetradecylbenzene and other benzenes having a long chain alkyl group; halogenated hydrocarbons such as methylene chloride, chloroform, carbon tetrachloride and 1,2-dichloroethane; and various oils such as silicon oil and olive oil, or a mixture thereof.

Preferably, those which are colored by dyes and which contain ionic surfactants are used as the liquid phase dispersion media 6b.

Examples of materials for capsule films of microcapsules 5 include a mixture of a polycationic material such as gelatin, and a polyanionic material such as gum Arabic, sodium alginate, carrageenan, carboxymethyl cellulose, agar, polyvinylbenzenesulfonic acid and polyvinyl ether maleic anhydride. Furthermore, examples thereof include formalin resorcinol resins, polyvinyl alcohols, polyurethane resins, acrylate resins, polymethyl-γ-methyl-L-glutamate, melamine, methacrylate resins, formaldehyde resins, polyvinyl pyrrolidone resins and fluorine resins.

Embodiments of Electronic Equipment

The electrophoretic apparatus of the present invention can be applied to the display portions of various electronic equipment, for example, electronic papers, electronic notes, electronic book, mobile type personal computers, cellular phones and digital still cameras.

Figure 14:
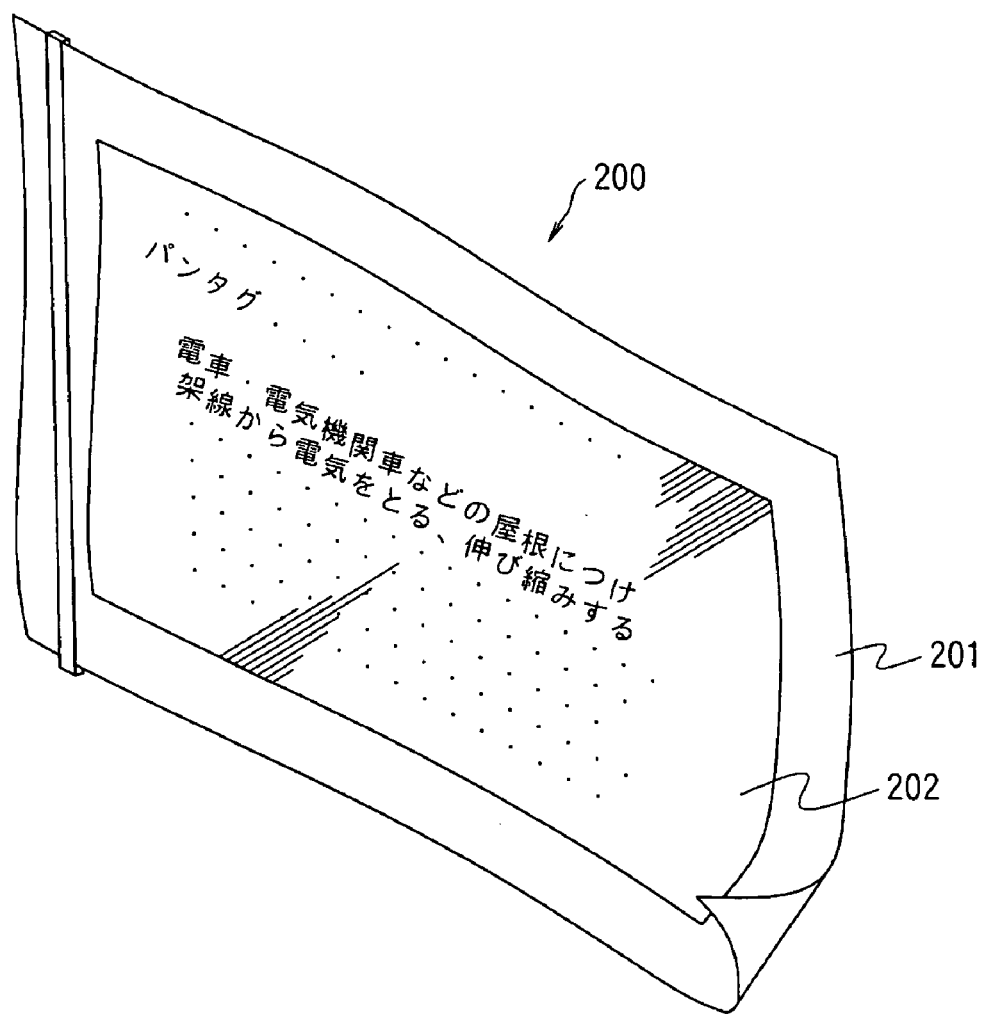
FIG. 14 is a perspective view showing the exterior configuration of the electronic paper as an example of the electronic equipment of the present invention.

FIG. 14 is a perspective view showing an exterior configuration of electronic paper (rewritable sheet). This electronic paper 200 is composed of a main body 201 and an electrophoretic display panel 202. The main body 201 and the electrophoretic display panel 202 are formed into the shape of a sheet having a paper-like feel and flexibility. A driving circuit of the electrophoretic display panel 202 is built in the main body 201 or is provided as a rewriting device separate from the electronic paper.

Figure 15A:
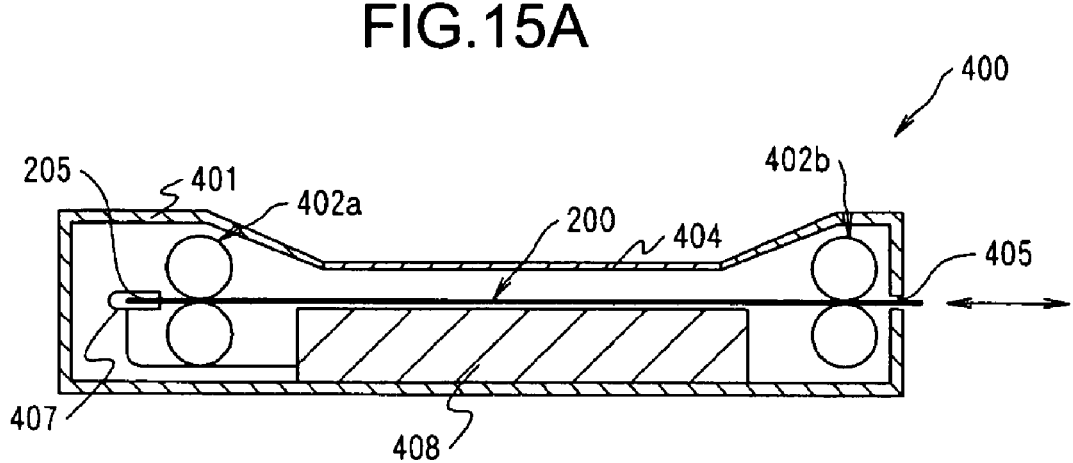
FIG. 15 is a sectional view (a) and a plan view (b) showing the rewriting/display device of the electronic paper as an example of the electronic equipment of the present invention.
Figure 15B:
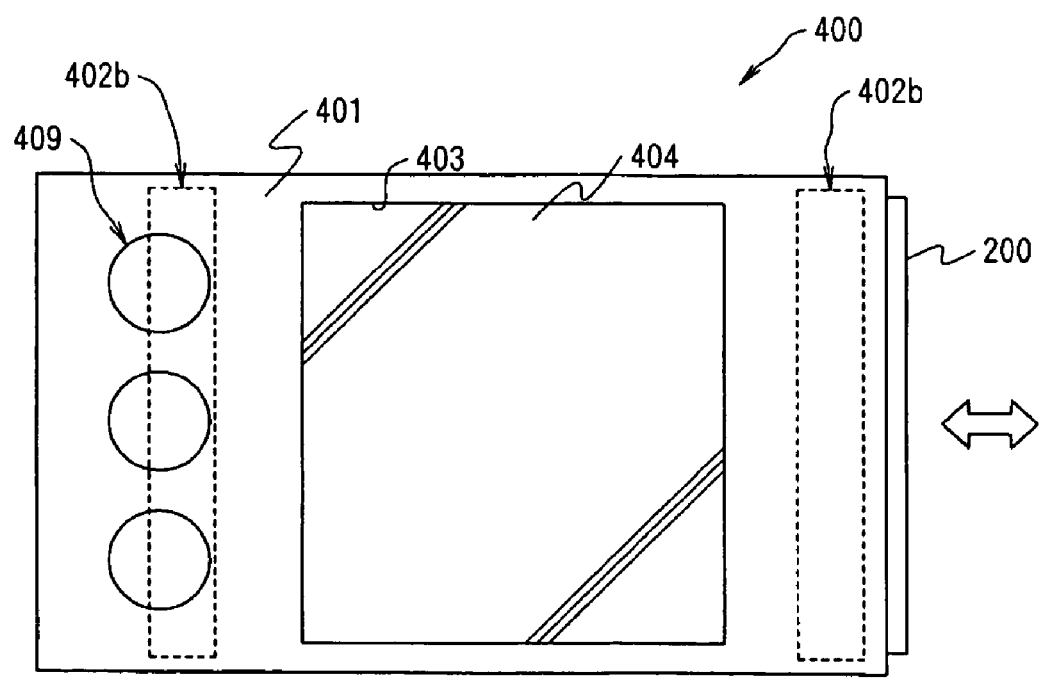

FIG. 15 is a sectional view (a) and a plan view (b) showing a rewriting/display device of the above-described electronic paper 200. This device is provided with a housing 401, two transfer roller pairs 402a and 402b, a rectangular hole 403 arranged in the observation surface (display surface) of the housing 401, a transparent glass plate 404 fitted into the rectangular hole 403, an insertion hole 405 for inserting into the housing 401 of the electronic paper 200, a socket 407, a controller 408, and an operating portion 409.

The two transfer roller pairs 402a and 402b are arranged in the interior of the housing 401 with a clearance therebetween. One transfer roller pair 402b is arranged in the proximity of an insertion hole 405 of the electronic paper 200, and the other transfer roller pair 402a is arranged at a position some distance from the insertion hole 405. The socket 407 is arranged in the side deeper (opposite to the insertion hole 405 side) than is the transfer roller pair 402a at the position some distance from the insertion hole 405.

A terminal portion 205 is provided at the end of the electronic paper 200. Both end portions of the electronic paper 200 inserted from the insertion hole 405 into the housing 401 are held with the two transfer roller pairs 402a and 402b. Under this condition, the terminal portion 205 of the electronic paper 200 is inserted into the socket 407, and the other end in the opposite side extends off the insertion hole 405. The electronic paper 200 can be taken off from the housing 401 by holding this end portion, followed by drawing the paper 200 out. The socket 407 is connected to the controller 408 provided with the driving circuit. The operating portion 409 is provided beside the transparent glass plate 404 of the display surface of the housing 401.

When this device is used, the electronic paper 200 is put into the housing 401 from the insertion hole 405 such that the display surface of the electronic paper 200 faces the transparent glass plate 404 side. The operating portion 409 is operated and, thereby, the controller 408 is activated to write an image on the electronic paper 200, and to erase or rewrite a displayed image. With respect to the electronic paper 200 on which the image has been written, the image can be seen through the transparent glass plate 404 while the electronic paper 200 is in the housing 401, or the electronic paper 200 can be taken off from the housing 401 and be carried.

Figure 16:
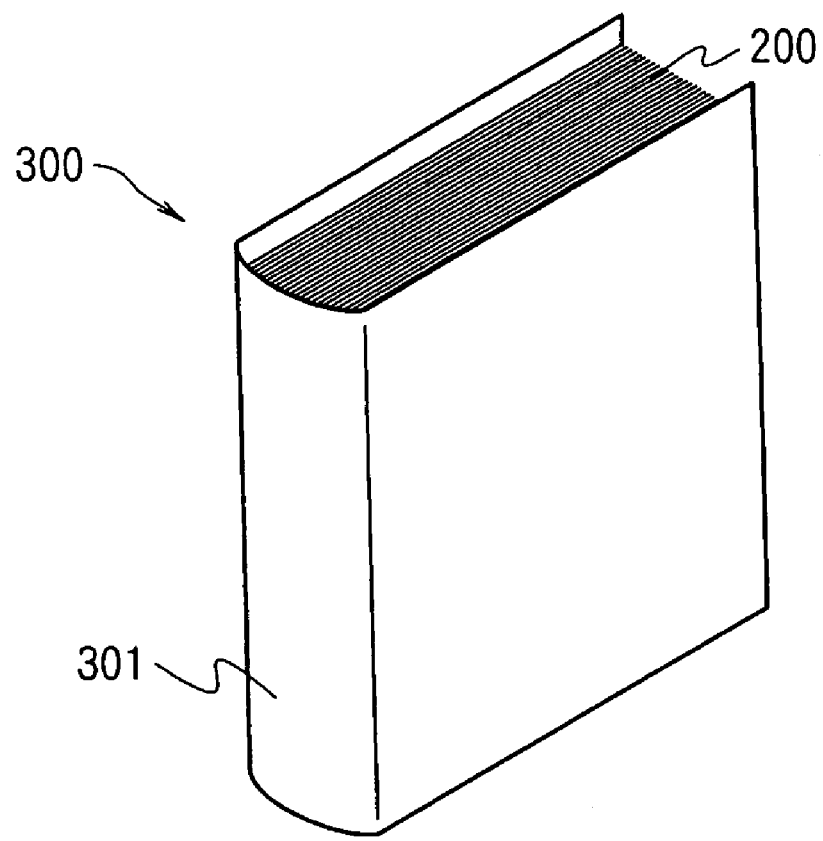
FIG. 16 is a perspective view showing the exterior configuration of the electronic note as an example of the electronic equipment of the present invention.

FIG. 16 is a perspective view showing an exterior configuration of an electronic note. In this electronic note, a plurality of the above-described electronic paper 200 shown in FIG. 14 are bound, and a cover 301 is provided on the outside thereof to take the shape of a notebook. When the cover 301 is provided with a display data input device, the display content of the electronic paper 200 in a bound state can be changed.

Figure 17:
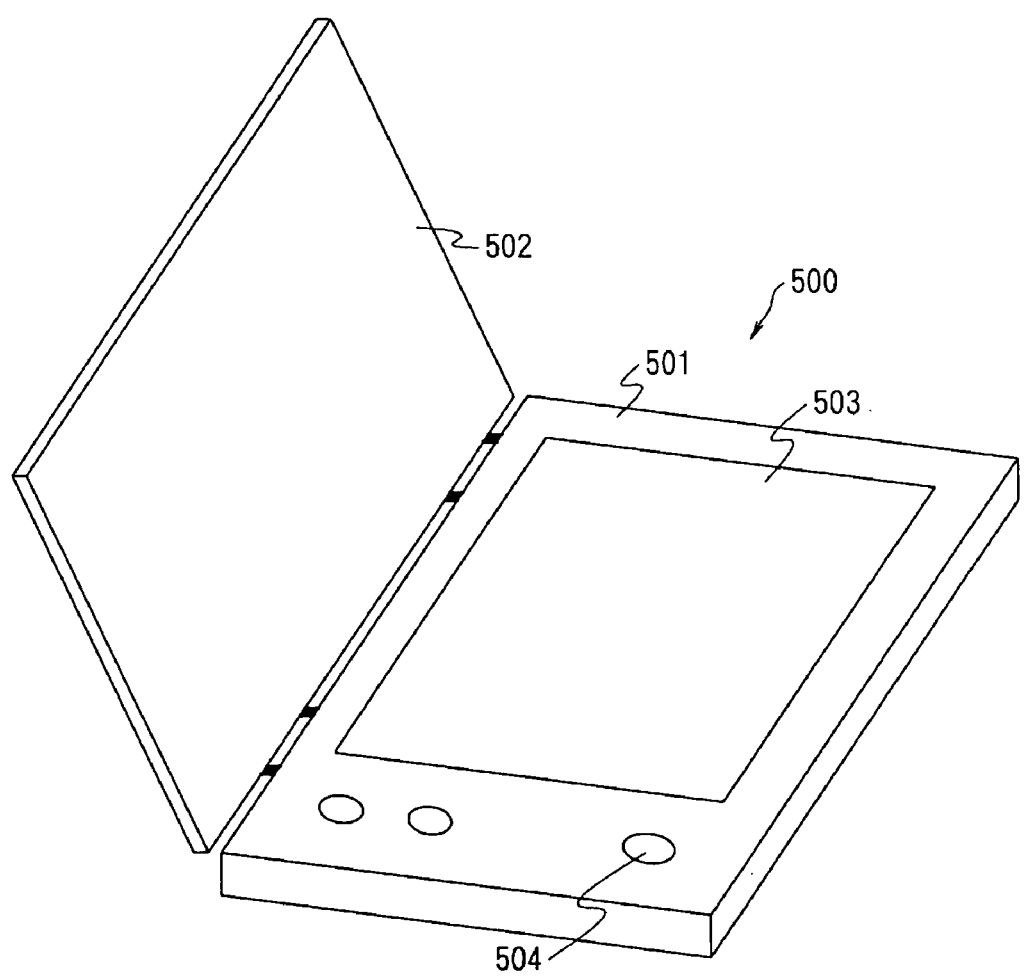
FIG. 17 is a perspective view showing the exterior configuration of the electronic book as an example of the electronic equipment of the present invention.

FIG. 17 is a perspective view showing an exterior configuration of an electronic book. This electronic book 500 is provided with a main body 501 composed of the electrophoretic display device and a cover 502. The main body 501 is provided with a display portion 503 and an operating portion 504. The cover 502 is attached to the main body 501 in order to be opened or closed at will, and is configured such that the display surface of the display portion 503 and the operating portion 504 are exposed as the cover 502 is opened. A controller, a counter, a memory, a data reader for reading data in a storage medium such as a CDROM, and the like are built in the main body 501.

Figure 18:
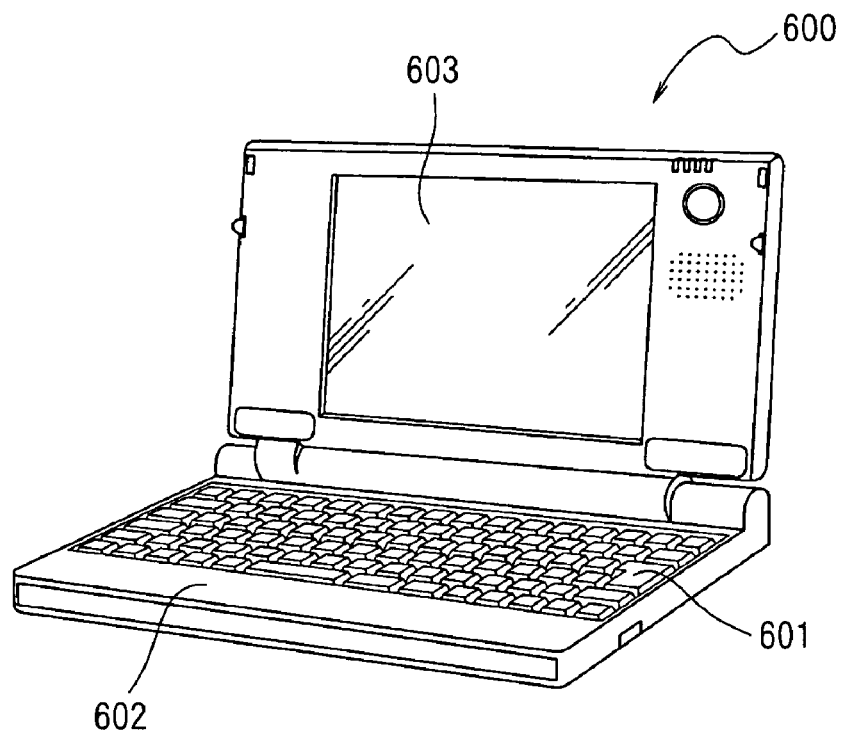
FIG. 18 is a perspective view showing the exterior configuration of the mobile type personal computer as an example of the electronic equipment of the present invention.

FIG. 18 is a perspective view showing an exterior configuration of a mobile type personal computer. This personal computer 600 includes a main body portion 602 provided with a keyboard 601, and a display unit 603 composed of the electrophoretic display device.

Figure 19:
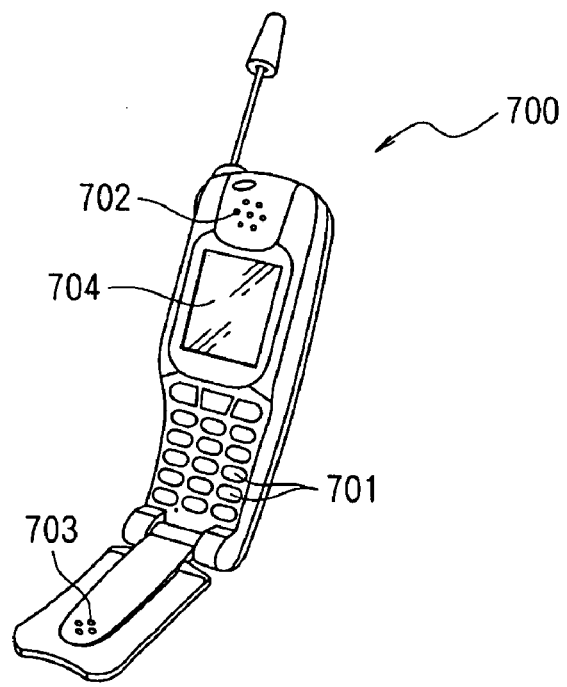
FIG. 19 is a perspective view showing the exterior configuration of a cellular phone as an example of the electronic equipment of the present invention.

FIG. 19 is a perspective view showing an exterior configuration of a cellular phone. This cellular phone 700 is provided with a plurality of operation buttons 701 and, in addition, an earpiece 702, a mouthpiece 703, and a display panel 704 composed of the electrophoretic display device.

Figure 20:
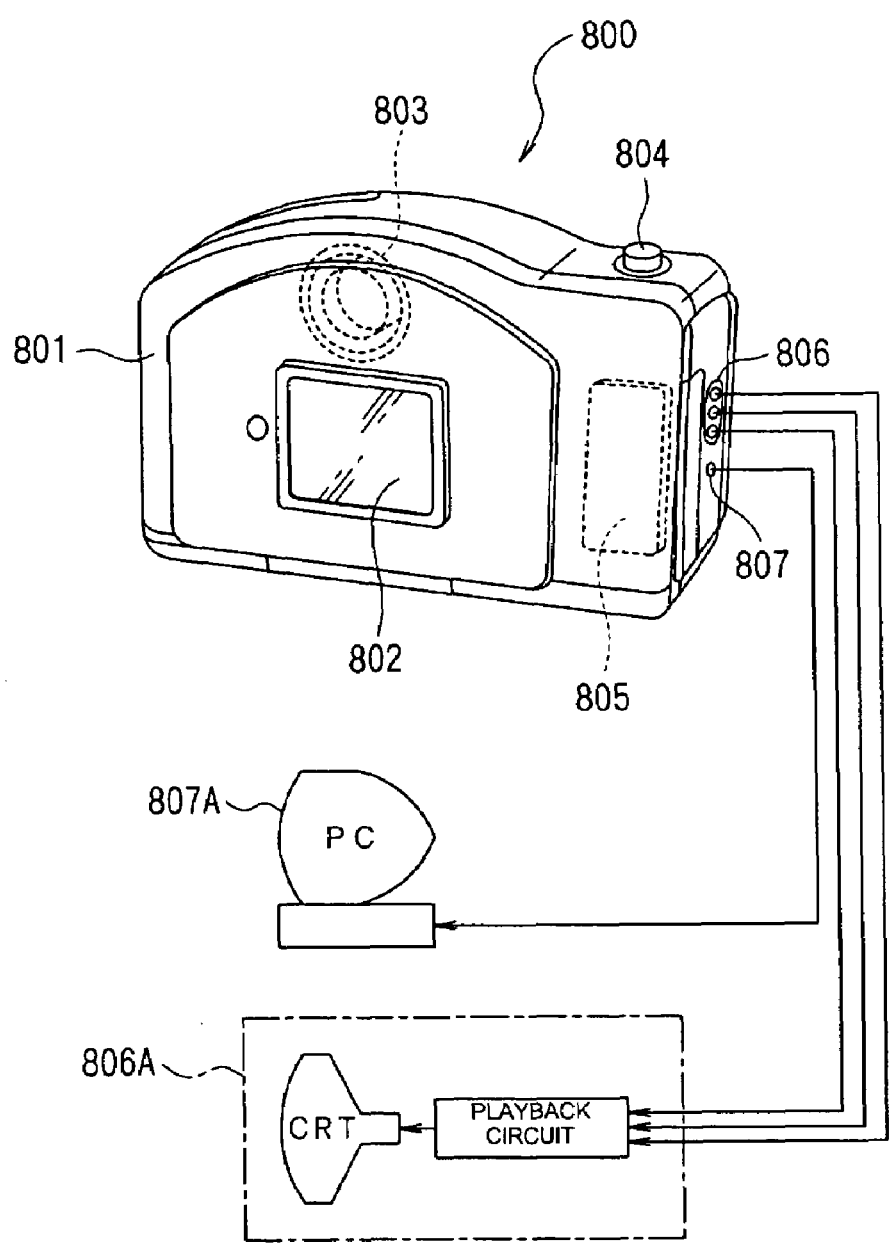
FIG. 20 is a perspective view showing the configuration of the digital still camera as an example of the electronic equipment of the present invention.

FIG. 20 is a perspective view showing the configuration of a digital still camera, and connection with external equipment is briefly shown. This digital still camera 800 is provided with a case 801, a display panel 802 which is formed on the back of the case 801 and which is composed of the electrophoretic display device performing display based on image pickup signals from a CCD (Charge Coupled Device), and a light receiving unit 803 including an optical lens. The CCD and the like are formed in the observation side (in the drawing, back side) of the case 801. A shutter button 804 and a circuit substrate 805, in which the image pickup signal from the CCD at the point when this shutter button 804 is pushed, is transferred and stored.

Video signal output terminals 806 and a data communication input-output terminal 807 are provided on the side surface of the case 801 of the digital still camera 800, and the former and the latter are connected to a television monitor 806A and a personal computer 807A, respectively, as necessary. Subsequently, the image pickup signal stored in a memory of the circuit substrate 805 is output to the television monitor 806A or the personal computer 807A through a predetermined operation.

In addition to them, examples of electronic equipment, to which the electrophoretic display device can be applied as a display portion and the like, include televisions, viewfinder type and monitor-direct-view type videotape recorders, car navigation devices, pagers, electronic notepads, desk-top calculators, word processors, work stations, videophones, POS terminals, equipment provided with a touch panel, and the like.

EXAMPLES

Example 1

Figure 13:
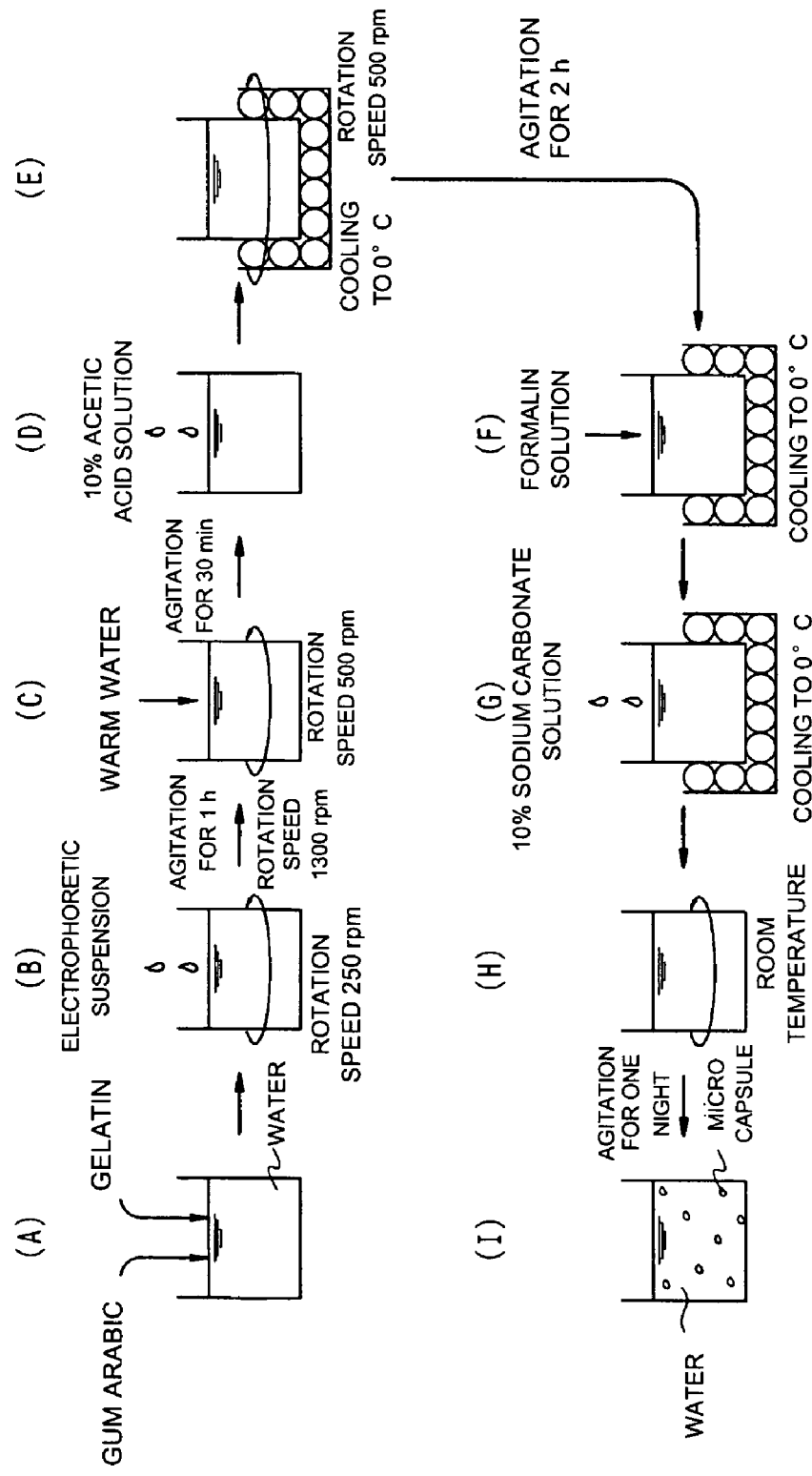
FIG. 13 is a diagram showing the manufacturing process of the microcapsules adopted in the examples.

An electrophoretic display panel was prepared by the following method, and a manufacturing process of the microcapsules will be described with reference to FIG. 13.

As shown in FIG. 13(A), 5.5 g of a gelatin powder (manufactured by Kanto Kagaku), 5.5 g of a gum Arabic powder (manufactured by Kanto Kagaku), and 60 g of were put in a 500 ml-beaker to dissolve these powders into the water.

As shown in FIG. 13(B), an electrophoretic suspension (prepared beforehand) is dropped into the resulting solution while the solution was agitated at a rotation speed of 250 rpm. After the dropping was completed, the rotation speed was increased to 1,300 rpm, and agitation was further performed for 1 hour.

This electrophoretic suspension was prepared by the following method. 50 g of $TiO_2$ particles (electrophoretic particles) "CR-90" manufactured by ISHIHARA SANGYO KAISHA, Ltd., 2.3 g of a titanate (titanic acid salt)-based coupling agent "KR-TTS" manufactured by Ajinomoto Co., Inc., 1 g of an aluminum-based coupling agent "AL-M" manufactured by Ajinomoto Co., Inc.:, and 300 g of dodecylbenzene (liquid phase dispersion medium) manufactured by Kanto Kagaku were put into a 500 ml-flask and agitated while an ultrasonic vibration was applied.

In this manner, a suspension was prepared in which $TiO_2$ particles were dispersed in dodecylbenzene, while being positively charged. One hundred grams of this suspension was taken out of this flask, and 1.8 g of anthraquinone-based blue dye (manufactured by CHUO SYNTHETIC CHEMICAL CO., LTD.) was dissolved into the suspension. In this manner, an electrophoretic suspension was prepared, in which white $TiO_2$ particles were dispersed in blue dodecylbenzene.

As shown in FIG. 13(C), 300 ml of warm water was added to the above-described solution while the above-described solution was agitated at a rotation speed of 500 rpm, followed by agitation for another 30 minutes at the same rotation speed.

As shown in FIG. 13(D), 11 ml of 10% acetic acid solution was dropped into the resulting solution. As shown in FIG. 13(E), agitation was performed for another 2 hours at a rotation speed of 500 rpm while the whole solution was kept at 0° C. by cooling from the outside of the beaker.

As shown in FIG. 13(F), 2.7 ml of formalin solution (manufactured by Kanto Kagaku) was added to the resulting solution. Furthermore, as shown in FIG. 13(G), 22 ml of 10% sodium carbonate solution was added to the resulting solution.

As shown in FIG. 13(H), the cooling was stopped, and the temperature of the whole solution was returned to room temperature, followed by further agitation at the same rotation speed. This agitation was performed for one night and, thereby, a microcapsule suspension in which microcapsules were dispersed in water was prepared, as shown in FIG. 13(I). The capsule film of this microcapsule is composed of a mixture of gelatin and gum Arabic at a ratio of 1:1, and an electrophoretic suspension (white $TiO_2$ particles+blue dodecylbenzene) is contained in this capsule film.

Microcapsules having particle diameters of 40 to 60 µm were taken out of the microcapsule suspension. Microcapsules having particle diameters larger than the above-described range were removed with a sieve, and microcapsules having particle diameters smaller than the above-described range were removed by a method using a separatory funnel.

The thus prepared microcapsules, a silicone binder "POLON-MF-40" manufactured by Shin-Etsu Chemical Co., Ltd., and an acrylic binder "E272" manufactured by Mitsui Toatsu Chemicals, Inc., were mixed such that a final weight ratio after drying of microcapsule:silicone resin: acrylic resin=10:1:1 was achieved. The resulting mixture was applied by coating to a PET film provided with pixel electrodes made of ITO (an ITO thin film patterned into the shape of pixels) to achieve a film thickness of 150 µm, followed by drying at 90° C. for 20 minutes. In this manner, a layer composed of microcapsules 5 and a binder 7 was formed on the surface of the PET film provided with the pixel electrodes.

A PET film provided with an ITO thin film all over the surface thereof was put on the above-described layer of the resulting PET film while the ITO thin film side was faced toward the above-described layer side, followed by laminating with a laminator. In this manner, an electrophoretic display panel was prepared, in which one pixel had the structure shown in FIG. 1. Here, the condition of lamination with the laminator was adjusted and, thereby, the spacing between the ITOs of the two PET films became slightly larger than the maximum diameter of the microcapsules, so that only one microcapsule was disposed in the panel thickness direction.

The resulting panel was connected to a driving circuit, and a driving test was performed. As a result, the display image holding time was one month or more, and in erasure, the change in color from white to blue occurred instantaneously with no occurrence of unevenness.

Example 2

Microcapsules prepared by the same method as that in Example 1 (except that the composition of the capsule film was changed to gelatin: gum Arabic=3:2), the silicone binder "POLON-MF-40" manufactured by Shin-Etsu Chemical Co., Ltd., and the acrylic binder "E272" manufactured by Mitsui Toatsu Chemicals, Inc., were mixed such that a final weight ratio after drying of microcapsule:silicone resin:acrylic resin=10:0.8:1.2 was achieved.

The resulting mixture was applied by coating to a PET film provided with pixel electrodes made of ITO (an ITO thin film patterned into the shape of pixels) to achieve a film thickness of 130 µm, followed by drying at 90° C. for 20 minutes. In this manner, a layer composed of microcapsules 5 and a binder 7 was formed on the surface of the PET film provided with the pixel electrodes.

The steps following this were performed by the same method as that in Example 1, so that an electrophoretic display panel 10 was prepared, in which one pixel had the structure shown in FIG. 1.

The resulting panel was connected to a driving circuit, and a driving test was performed. As a result, the display image holding time was one month or more, and in erasure, the change in color from white to blue occurred instantaneously with no occurrence of unevenness.

Example 3

An electrophoretic display panel was prepared by the same method as that in Example 1 except that an electrophoretic suspension was prepared by the following method.

The electrophoretic suspension was prepared by the following method. 50 g of $TiO_2$ particles (electrophoretic particles) "CR-90" manufactured by ISHIHARA SANGYO KAISHA, Ltd., 50 g of black acrylic resin particles (electrophoretic particles) manufactured by Soken Chemical and Engineering Co., Ltd., 2.3 g of a titanate (titanic acid salt)-based coupling agent "KR-TTS" manufactured by Ajinomoto Co., Inc., 1 g of an aluminum-based coupling agent "AL-M" manufactured by Ajinomoto Co., Inc., and 300 g of dodecylbenzene (liquid phase dispersion medium) manufactured by Kanto Kagaku were put into a 500 ml-flask, followed by agitation while ultrasonic vibration was applied.

In this manner, an electrophoretic suspension was prepared, in which white $TiO_2$ particles were dispersed in dodecylbenzene, while being negatively charged, and the black acrylic resin particles were dispersed in dodecylbenzene, while being positively charged. As shown in FIG. 13(B), the resulting electrophoretic suspension was dropped into a solution of a gelatin powder and a gum Arabic powder while the solution was agitated at a rotation speed of 250 rpm.

Figure 4:
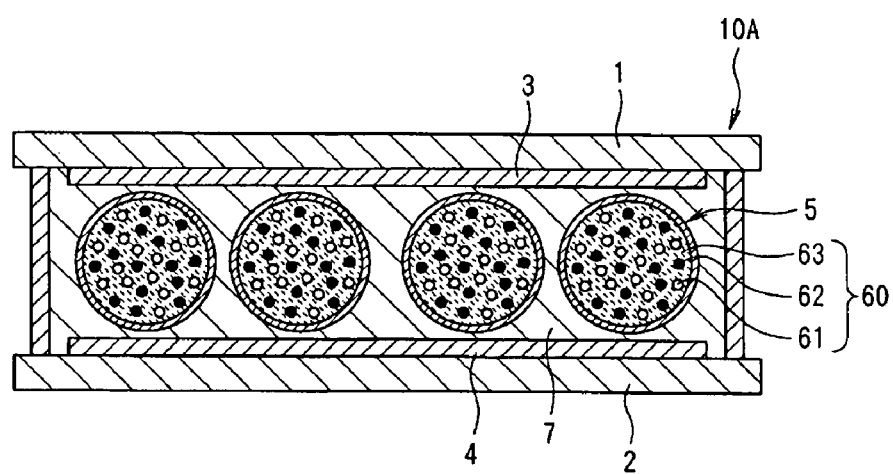
FIG. 4 is a sectional view of one pixel showing the electrophoretic display panel corresponding to the third embodiment of the present invention.

The steps other than this were performed by the same method as that in Example 1, so that an electrophoretic display panel 10A was prepared, in which one pixel had the structure shown in FIG. 4.

The resulting panel was connected to a driving circuit, and a driving test was performed. As a result, the display image holding time was one month or more, and in erasure, the change in color from white to black occurred instantaneously with no occurrence of unevenness.

Example 4

An electrophoretic display panel was prepared by the following method.

Microcapsules were prepared by the same method as that in Example 1. The resulting microcapsules and a silicone binder "POLON-MF-40" manufactured by Shin-Etsu Chemical Co., Ltd., were mixed such that a final weight ratio after drying of microcapsule:silicone resin=5:1 was achieved. A paste composed of the resulting mixture was applied by coating to a PET film provided with pixel electrodes made of ITO (an ITO thin film patterned into the shape of pixels) to achieve a film thickness of 150 µm, followed by keeping at 90° C. for 30 minutes.

In this manner, most of the water was removed from the paste coating film. An acrylic binder "E272" manufactured by Mitsui Toatsu Chemicals, Inc., was applied thereto by coating to achieve a predetermined thickness (a thickness corresponding to a thickness after drying of 1 µm), followed by drying at 90° C. for 20 minutes. In this manner, a layer composed of the microcapsules and the silicone resin (first binder) and a layer composed of the acrylic resin (second binder) were formed in that order on the surface of the PET film provided with the pixel electrodes. When the acrylic binder is applied by coating onto the layer composed of the microcapsules and the silicone resin, the acrylic binder may diffuse into the silicone resin in the above-described layer.

A PET film provided with an ITO thin film all over the surface thereof was put on the layer composed of the acrylic resin of the resulting PET film while the ITO thin film side was faced toward the above-described layer side, followed by laminating with a laminator. In this manner, an electrophoretic display panel 10B was prepared, in which one pixel had the structure shown in FIG. 7. Here, the condition of lamination with the laminator was adjusted and, thereby, the spacing between the pixel electrode of one PET film and the layer composed of the acrylic resin of the other PET film became slightly larger than the maximum diameter of the microcapsules, so that only one microcapsule was disposed in the panel thickness direction.

The resulting panel was connected to a driving circuit, and a driving test was performed. As a result, the display image holding time was one month or more, and in erasure, the change in color from white to blue occurred instantaneously with no occurrence of unevenness.

Example 5

Figure 7:
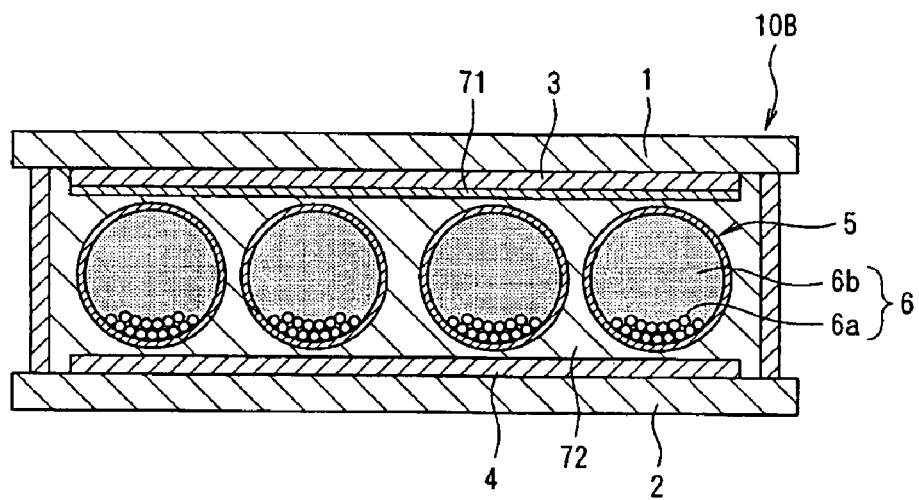
FIG. 7 is a sectional view of one pixel showing the electrophoretic display panel corresponding to the fifth embodiment of the present invention.

An electrophoretic display panel 10B in which one pixel had the structure shown in FIG. 7 was prepared by the same method as that in Example 4 except that the composition of the capsule film was adjusted in order that the ratio of gelatin:gum Arabic=3:2 was achieved in preparation of microcapsules.

The resulting panel was connected to a driving circuit, and a driving test was performed. As a result, the display image holding time was one month or more, and in erasure, the change in color from white to blue occurred instantaneously with no occurrence of unevenness.

Example 6

An electrophoretic display panel was prepared by the same method as that in Example 4 except that an electrophoretic suspension was prepared by the following method.

The electrophoretic suspension was prepared by the following method. 50 g of $TiO_2$ particles (electrophoretic particles) "CR-90" manufactured by ISHIHARA SANGYO KAISHA, Ltd., 50 g of black acrylic resin particles (electrophoretic particles) manufactured by Soken Chemical and Engineering Co., Ltd., 2.3 g of a titanate (titanic acid salt)-based coupling agent "KR-TTS" manufactured by Ajinomoto Co., Inc., 1 g of an aluminum-based coupling agent "AL-M" manufactured by Ajinomoto Co., Inc., and 300 g of dodecylbenzene (liquid phase dispersion medium) manufactured by Kanto Kagaku were put into a 500 ml-flask, followed by agitation while ultrasonic vibration was applied.

In this manner, an electrophoretic suspension was prepared, in which white $TiO_2$ particles were dispersed in dodecylbenzene while being negatively charged and the black acrylic resin particles were dispersed in dodecylbenzene while being positively charged. As shown in FIG. 13(B), the resulting electrophoretic suspension was dropped into a solution of a gelatin powder and a gum Arabic powder while the solution was agitated at a rotation speed of 250 rpm.

Figure 10:
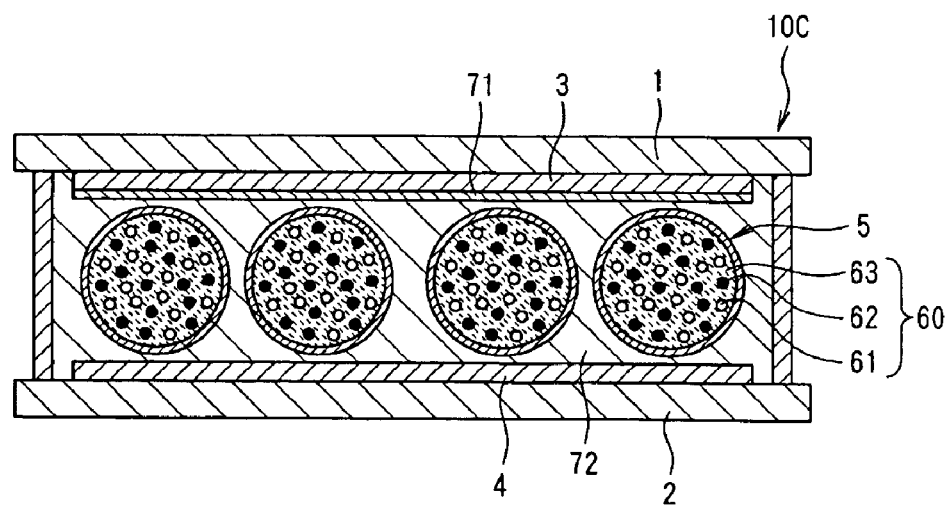
FIG. 10 is a sectional view of one pixel showing the electrophoretic display panel corresponding to the seventh embodiment of the present invention.

The steps other than this were performed by the same method as that in Example 4, so that an electrophoretic display panel 10C was prepared, in which one pixel had the structure shown in FIG. 10.

The resulting panel was connected to a driving circuit, and a driving test was performed. As a result, the display image holding time was one month or more, and in erasure, the change in color from black to white occurred instantaneously with no occurrence of unevenness.

What is claimed is:

1. An electrophoretic apparatus comprising a first electrode, a second electrode and a plurality of closed spaces divided by partitions,
    wherein the closed space contains an electrophoretic suspension in which electrophoretic particles are dispersed in a dispersion medium, and the electrophoretic particles migrate by application of a voltage via the first electrode and the second electrode,
    wherein a component is disposed between the closed space and at least one of the first electrode and the second electrode,
    wherein the component comprises a mixture including at least two different materials of a first material and a second material,
    wherein the first material and the second material have different holding powers for holding the uneven distribution state of the electrophoretic particles without applying any voltage, the uneven distribution state being caused by the application of a voltage, and
    wherein the holding power of the first material is higher than that of the second material.

2. The electrophoretic apparatus according to claim 1, wherein the affinity of the first material for the electrophoretic particles is higher than the affinity of the second material for the electrophoretic particles.

3. The electrophoretic apparatus according to claim 1, wherein the polarity of the first material is higher than the polarity of the second material.

4. The electrophoretic apparatus according to claim 1,
wherein the electrophoretic particles are titanium dioxide ($TiO_2$) particles,
wherein the first material is an acrylic resin, and
wherein the second material is a silicone resin.

5. The electrophoretic apparatus according to claim 1,
wherein the electrophoretic particles comprise positively charged particles and negatively charged particles which have colors different from each other.

6. The electrophoretic apparatus according to claim 1,
wherein the electrophoretic particles comprise titanium dioxide ($TiO_2$) particles and colored particles made of an acrylic resin,
wherein the first material is an acrylic resin, and
wherein the second material is a silicone resin.

* * * * *